United States Patent
Suzuki et al.

(10) Patent No.: US 10,630,968 B2
(45) Date of Patent: Apr. 21, 2020

(54) SOLID-STATE IMAGE SENSOR AND IMAGING APPARATUS

(71) Applicant: RICOH COMPANY, LTD., Tokyo (JP)

(72) Inventors: Atsushi Suzuki, Hyogo (JP); Tohru Kanno, Kanagawa (JP); Yuuya Miyoshi, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 269 days.

(21) Appl. No.: 15/450,480

(22) Filed: Mar. 6, 2017

(65) Prior Publication Data

US 2017/0272742 A1    Sep. 21, 2017

(30) Foreign Application Priority Data

Mar. 18, 2016    (JP) .................................. 2016-056326

(51) Int. Cl.
*H04N 17/00*    (2006.01)
*H04N 5/378*    (2011.01)
(Continued)

(52) U.S. Cl.
CPC .......... *H04N 17/002* (2013.01); *H04N 5/3653* (2013.01); *H04N 5/374* (2013.01); *H04N 5/378* (2013.01); *H04N 5/04* (2013.01)

(58) Field of Classification Search
CPC .................................................... H04N 17/002
(Continued)

(56) References Cited

U.S. PATENT DOCUMENTS

2008/0259164 A1*  10/2008  Taura .................... H04N 5/335
                                                         348/207.1
2011/0279724 A1*  11/2011  Kajihara .............. H04N 5/3745
                                                         348/308

(Continued)

FOREIGN PATENT DOCUMENTS

JP    2000-324404    11/2000
JP    2010-114487 A   5/2010
(Continued)

OTHER PUBLICATIONS

Office Action dated Dec. 10, 2019, issued in corresponding Japanese Patent Application No. 2016-056326, six pages.

*Primary Examiner* — Jefferey F Harold
*Assistant Examiner* — Justin B Sanders
(74) *Attorney, Agent, or Firm* — Xsensus LLP

(57) ABSTRACT

A solid-state image sensor includes a pixel unit having a plurality of pixels arranged in matrix, a read signal processing circuit, a test signal output circuit, a test signal generating circuit, and a control circuit that controls operations of the above mentioned circuits. Each of the plurality of pixels outputs a pixel signal that is obtained by amplifying a photoelectrically converted signal using an output amplifier in one or more pixel units. The read signal processing circuit reads the pixel signal output from the pixel unit in units of one or more pixels to a corresponding signal line and processes the pixel signal. The test signal output circuit, having a test output amplifier for each signal line, outputs a signal from the test output amplifier to the signal line in response to a test signal input to the test output amplifier. The test signal generating circuit generates the test signal.

12 Claims, 13 Drawing Sheets

(51) Int. Cl.
  *H04N 5/374* (2011.01)
  *H04N 5/365* (2011.01)
  *H04N 5/04* (2006.01)

(58) Field of Classification Search
  USPC .......................................................... 348/181
  See application file for complete search history.

(56) References Cited

U.S. PATENT DOCUMENTS

2012/0194716 A1* 8/2012 Hagihara ............. H04N 5/3658
                                                348/300
2012/0228609 A1   9/2012 Okita et al.
2016/0006961 A1* 1/2016 Asaba .................. H04N 5/3692
                                                358/482

FOREIGN PATENT DOCUMENTS

| JP | 2011-239344   | 11/2011 |
| JP | 2012-039299   | 2/2012  |
| JP | 2012-199913 A | 10/2012 |
| JP | 2015-106908   | 6/2015  |

* cited by examiner

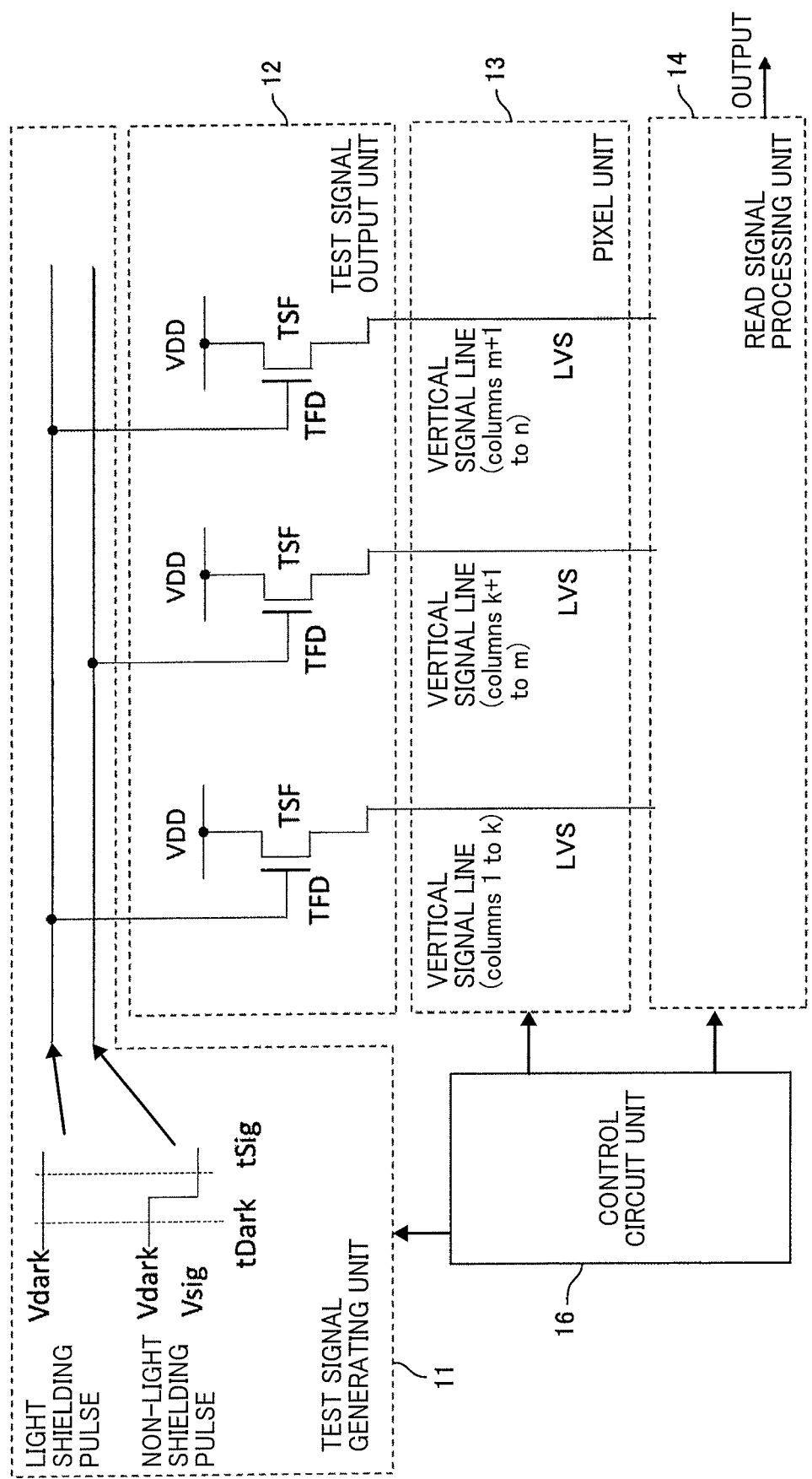

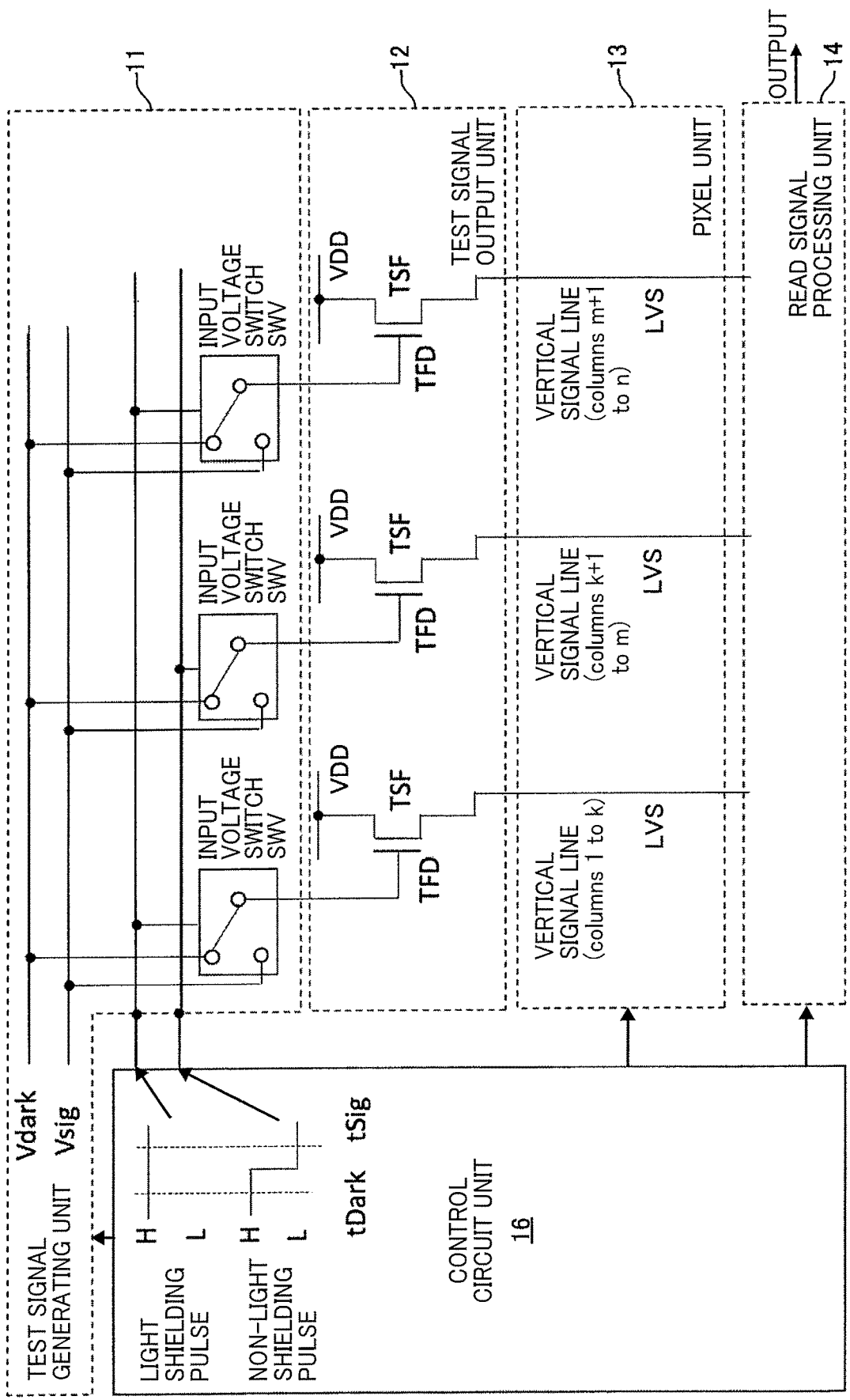

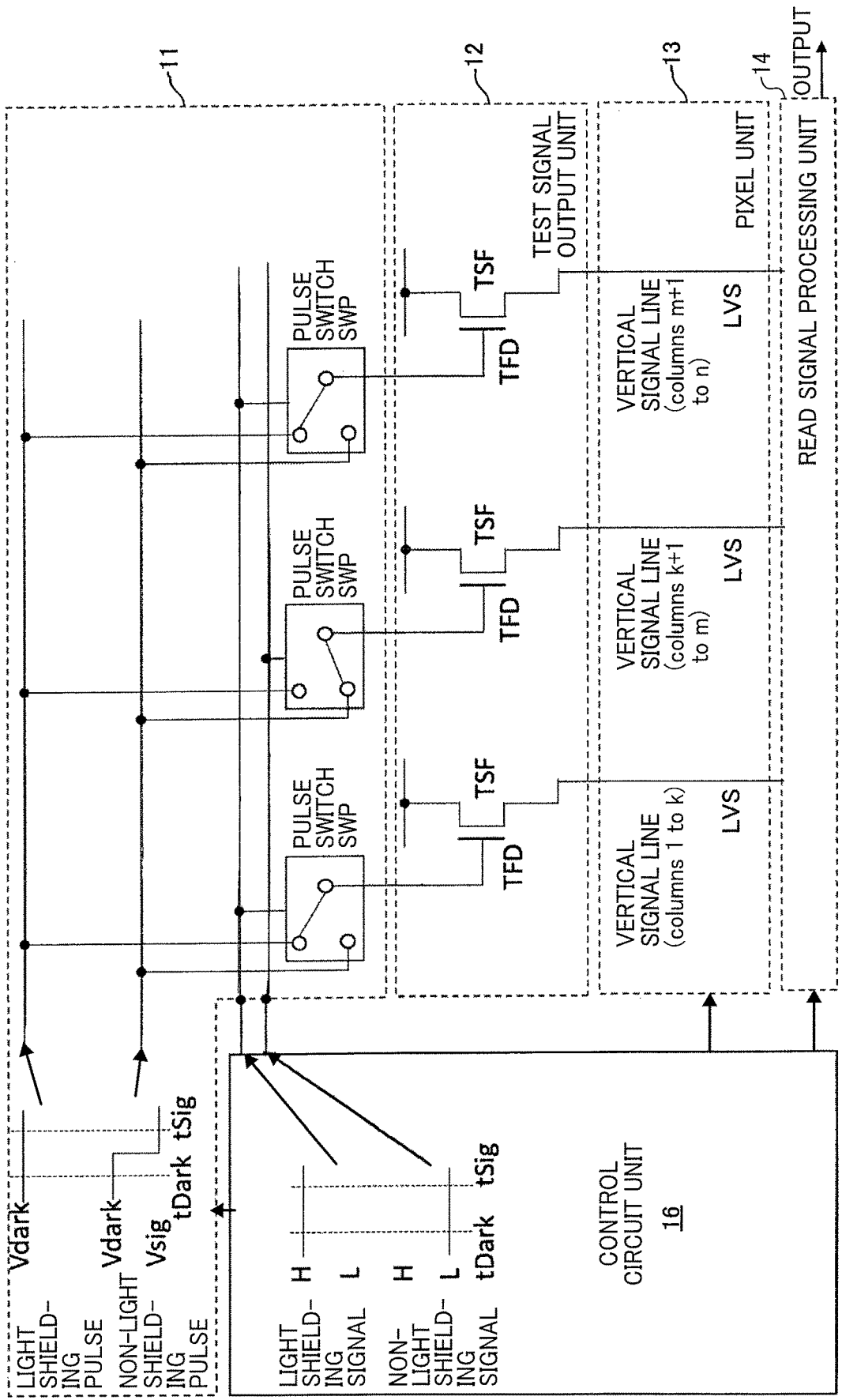

SOLID-STATE IMAGE SENSOR AND IMAGING APPARATUS

CROSS-REFERENCE TO RELATED APPLICATION

This patent application is based on and claims priority pursuant to 35 U.S.C. § 119(a) to Japanese Patent Application No. 2016-056326, filed on Mar. 18, 2016, in the Japan Patent Office, the entire disclosure of which is hereby incorporated by reference herein.

BACKGROUND

Technical Field

The embodiments of the present disclosure relates to a solid-state image sensor and an imaging apparatus.

Description of the Related Art

A complementary metal oxide semiconductor (CMOS) sensor, which is a type of solid-state image sensor, can be manufactured in the same process as a general CMOS integrated circuit, and the CMOS sensor is able to include an analog circuit and a digital circuit on the same chip. Such a CMOS image sensor including the analog circuit and the digital circuit on the same chip have an advantage of reducing the number of peripheral integral circuits (IC).

The CMOS image sensor includes a plurality of pixels each of which has a floating diffusion node (FD) to convert charges, which are previously photoelectrically converted, into a voltage, and an output amplifier (SF) to output the voltage as a pixel single. The pixel signal output from the SF is then read out in a column direction through a vertical signal line and output to the outside of the CMOS image sensor as image data that is one of analog data to which pixel signals are amplified with an analog circuit serving as a read processing unit and digital data into which the analog data is converted with the analog-to-digital (A/D) conversion circuit. The CMOS image sensor generally performs parallel output.

The output amplifier disposed in the pixel for the FD does not get sufficient driving capability. To compensate this matter, it is necessary to take a long time to output the pixel signal to the analog circuit or the A/D conversion circuit. The parallel output of data is effective to take a long time to output the pixel signal to the analog circuit or the A/D conversion circuit. In such a CMOS image sensor that outputs the data in parallel, "horizontal stripe noise" caused by "variation in output signal levels" may occur.

A known solid-state image sensor has an evaluation pattern generating unit to generate an evaluation pattern for evaluating the "horizontal stripe noise", which quantitatively evaluates the "horizontal stripe noise" that occurs in processing with a column processing circuit (A/D conversion circuit). The evaluation pattern generating unit disconnects a selected column from a pixel unit and connects to fixed potential and keeps a non-selected column connected to the pixel unit, and then process a signal with reading unit.

SUMMARY

A solid-state image sensor includes a pixel unit having a plurality of pixels arranged in matrix, a read signal processing circuit, a test signal output circuit, a test signal generating circuit, and a control circuit that controls operations of the above mentioned circuits. Each of the plurality of pixels outputs a pixel signal that is obtained by amplifying a photoelectrically converted signal using an output amplifier in one or more pixel units. The read signal processing circuit reads the pixel signal output from the pixel unit in units of one or more pixels to a corresponding signal line and processes the pixel signal. The test signal output circuit, having a test output amplifier for each signal line, outputs a signal from the test output amplifier to the signal line in response to a test signal input to the test output amplifier. The test signal generating circuit generates the test signal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 12 is a block diagram illustrating a solid-state image sensor according to a first example, in which circuit configurations of a test signal generating unit that generates a test pattern in a column direction and a test signal output unit are illustrated;

FIG. 13 is a diagram illustrating a solid-state image sensor according to a second example, in which circuit configurations of a test signal generating unit that generates a test pattern in a column direction and a test signal output unit are illustrated;

FIG. 14 is a diagram illustrating a solid-state image sensor according to a third example, in which circuit configurations of a test signal generating unit that generates a test pattern in a column direction and a test signal output unit are illustrated.

DETAILED DESCRIPTION

Figure 1:
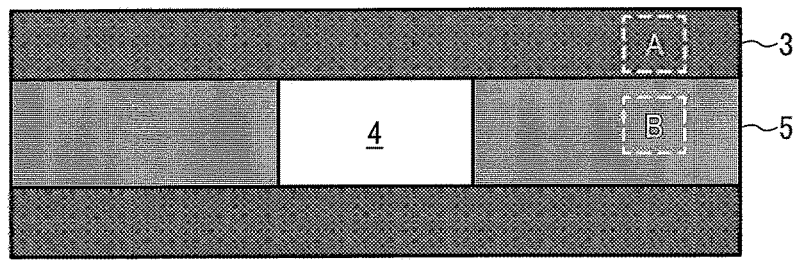
FIG. 1 is an illustration of variation in output signal levels in association with a white image on a black background.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Figure 2:
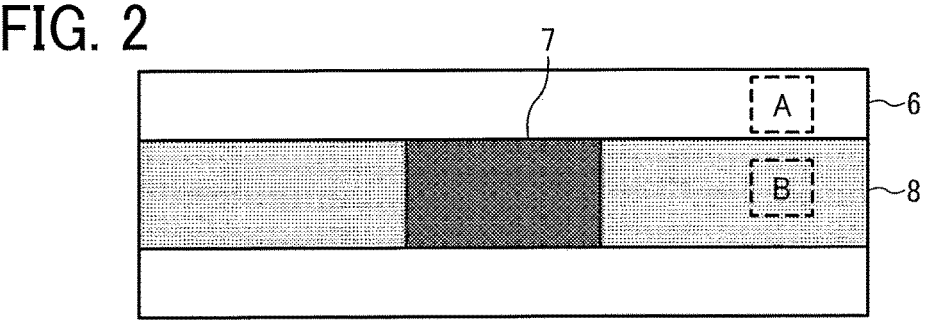
FIG. 2 is an illustration of variation in output signal levels in association with a black image on a white background.
Figure 3:
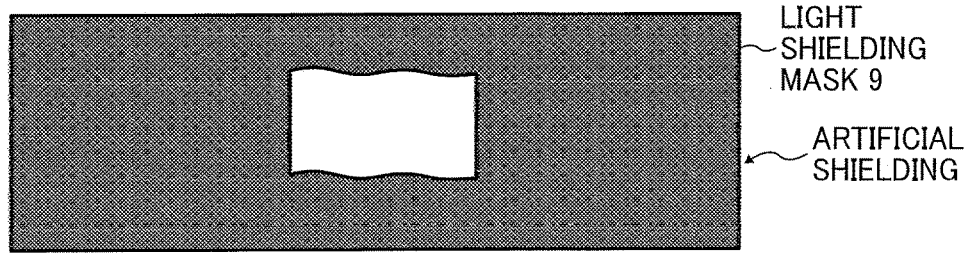
FIG. 3 is an illustration of an evaluation pattern for the variation in output signal levels in association with the white image on the black background illustrated in FIG. 1.

Embodiments of the disclosure is described below with reference to the accompanying drawings. Before describing the embodiments, an explanation of variation in output signal levels and evaluation of the variation in a solid-state image sensor is given with reference to FIGS. 1 to 3. FIG. 1 is an illustration of variation in output signal levels in association with a white image on a black background. FIG. 2 is an illustration of variation in output signal levels in association with a black image on a white background. FIG. 3 is an illustration of an evaluation pattern for the variation in output signal levels in association with the white image on the black background illustrated in FIG. 1.

"Variation in output signal levels" in the solid-state image sensor is classified as a type of "horizontal stripe noise". In FIG. 1, a stripe 5 that extends right to left from a white image 4 represents the variation in output signal levels, when there is the white image 4 in a black background 3. In FIG. 2, a stripe 8 that extends right to left from a black image 7 represents the variation in output signal levels, when there is the black image 7 in a black background 6. The variation in output signal levels as illustrated in FIG. 1 is, hereinafter, referred to as "variation of output signal level of white in a black background", and the variation in output signal levels as illustrated in FIG. 2 is, hereinafter, referred to as "variation of output signal level of black in a white background" in the description to distinguish from each other.

A method of quantitatively measuring the variation of output signal level of white in the black background includes calculating the difference in mean value between output of an area A, in which all pixels in the same row do not react to light but are fixed to a black level, and output of an area B, in which all pixels in the same row react to light. A method of quantitatively measuring the variation of the output signal level of black in the white background includes calculating the difference in mean value between output of an area A, in which all pixels in the same row react to light, and output of an area B, in which all pixels in the same row do not react to the light and are fixed to the black level.

The solid-state image sensor is required to partially shield the surface of the solid-state image sensor from the light with a light shielding mask 9 to create these two areas, and needs an external operation to accomplish that goal. However, blocking out the light completely by external operation and reproducing an evaluation is difficult.

Example Configuration of Solid-State Image Sensor

Figure 4:
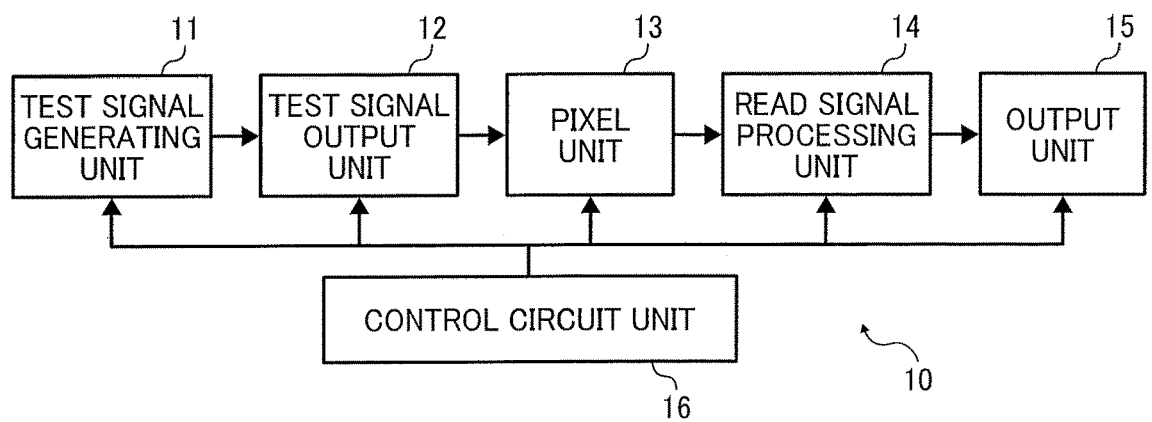
FIG. 4 is a block diagram illustrating an exemplary configuration of a solid-state image sensor having a column parallel analog-to-digital (A/D) conversion element according to an embodiment.

FIG. 4 is a block diagram illustrating an exemplary configuration of a solid-state image sensor 10 having a parallel analog-to-digital (A/D) conversion element according to an embodiment of the present disclosure. The solid-state image sensor 10 of FIG. 4 includes a test signal generating unit 11, a test signal output unit 12, a pixel unit 13, a read signal processing unit 14, an output unit 15, and a control circuit unit 16.

The pixel unit 13 includes a plurality of pixels, arranged in matrix, in each of which a signal that is photoelectrically converted from light into an electrical signal is amplified by an output amplifier to output a pixel signal. The read signal processing unit 14 reads out the pixel signal from the pixel unit 13 to a signal line in units of a single pixel or multiple pixels, and processes the pixel signal. The read signal processing unit 14, accordingly, includes an analog amplifier serving as a pixel reading circuit. Additionally, the read signal processing unit 14 may further include an analog-to-digital (A/D) conversion circuit.

The output unit 15 includes an output amplifier used for an analog signal processed by the read signal processing unit 14, and a differential amplification circuit for digital data used for a digital signal that is digitalized with the A/D conversion circuit. The test signal generating unit 11 requires no external operation for blocking out light in relation to variation in output signal levels, and includes a circuit to generate a test signal (voltage signal) for generating an evaluation pattern for quantitative evaluation, and the evaluation pattern can be reproduced. The evaluation pattern can measure the variation of output signal level of white in the black background and the variation of output signal level of black in the white background simultaneously, in a single shot.

The test signal output unit 12 includes an output amplifier for testing (test output amplifier) for each signal line. Each test output amplifier is disposed in an area outside of the pixel unit 13. The test signal output unit 12 outputs a signal from the test output amplifier to the signal line in response to input of the test signal to the test output amplifier. The test output amplifier inputs the test signal that is the evaluation pattern generated with the test signal generating unit 11. A test evaluation pattern, which is artificially generated with the test signal generating unit 11, can be reproduced by the read signal processing unit 14 in the same way as the pixel of the pixel unit 13 is output. The test evaluation pattern artificially generated, in the present embodiment, is a pattern that is generated by internal processing and is equal to the evaluation pattern generated by blocking out light externally.

The control circuit unit 16 controls voltage generation and pulse drive conducted by the test signal generating unit 11 and timing to generate an internal clock to read the signals sequentially from the pixel unit 13. The control circuit unit 16 also has a vertical scanning function to control a row address and row scanning, a signal processing control function of the read signal processing unit 14, and an output control function of the output unit 15.

First Embodiment

Figure 5:
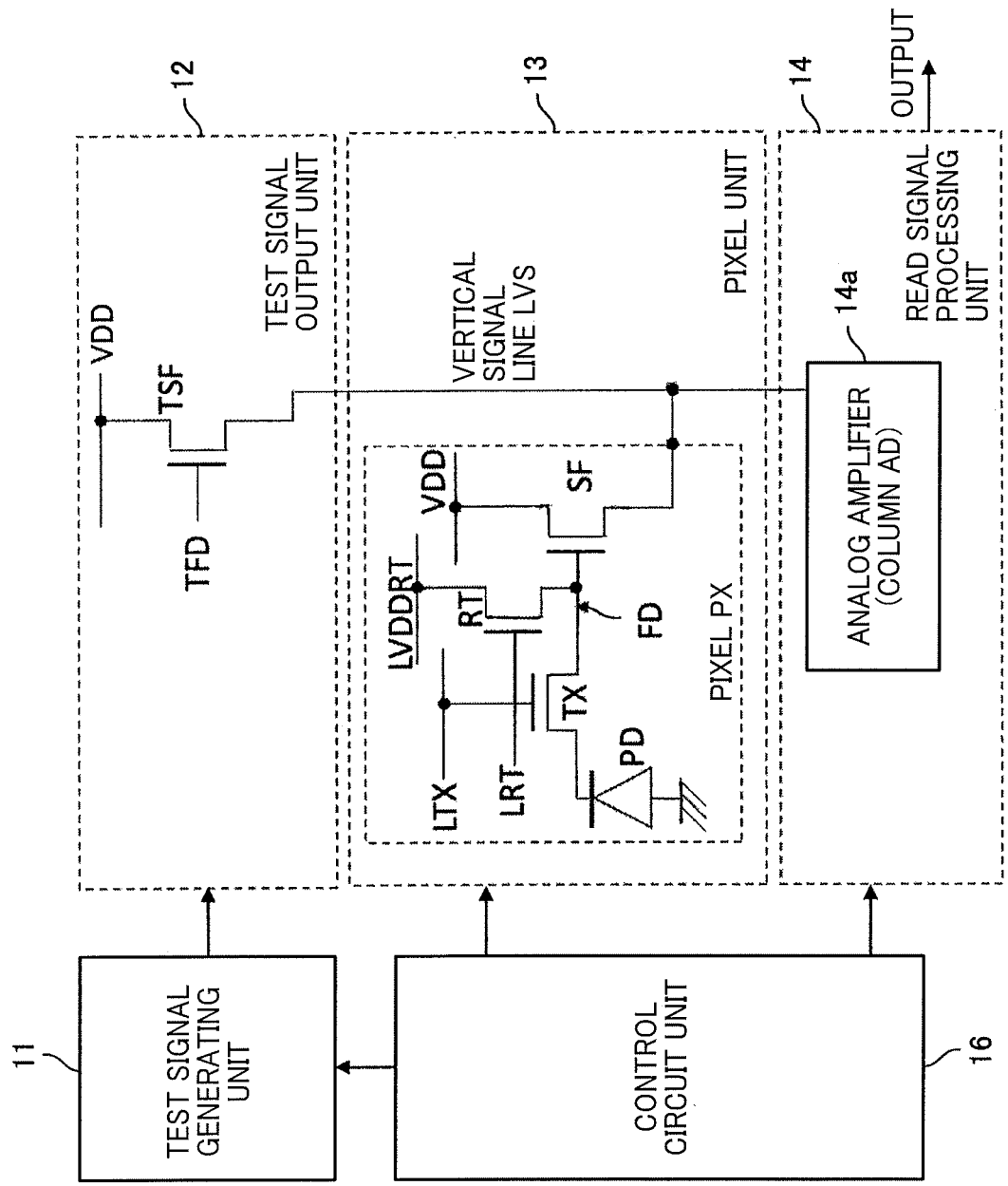
FIG. 5 is a block diagram illustrating a solid-state image sensor according to a first embodiment, in which a circuit configuration of an output amplifier (test output amplifier) of a test signal output unit in FIG. 4 and a circuit configuration of a pixel of a pixel unit in FIG. 4 are illustrated.

FIG. 5 is a block diagram illustrating a solid-state image sensor according to a first embodiment of the present disclosure, in which a detailed circuit configuration of an output amplifier (test output amplifier) of the test signal output unit 12 in FIG. 4 and a circuit configuration of a pixel of the pixel unit 13 in FIG. 4 are illustrated. The circuit configuration of FIG. 5 is described in terms of the pixels of the pixel unit 13 and the test output amplifier of the test signal output unit 12.

A pixel PX of the pixel unit 13 includes a photoelectric conversion element PD, a transfer transistor TX, a reset transistor RT, an amplifier transistor SF, and a floating diffusion node FD. The pixel PX includes a power supply VDD, a control line LTX of the transfer transistor TX, a control line LRT of the rest transistor RT, and a reset power supply control line LVDDRT. In the example, the amplifier transistor SF is configured as an output amplifier. The transfer transistor TX is connected between the photoelectric conversion element PD, such as a photo diode, and the floating diffusion node FD serving as an output node. When the control circuit unit 16 applies a drive signal to the transfer control line LTX, the transfer transistor TX transfers electrons that are photoelectrically converted at the photoelectric conversion element PD to the floating diffusion node FD.

The reset transistor RT is connected between the reset power supply control line LVDDRT and the floating diffusion node FD. When a drive signal for resetting is applied to the gate of the reset transistor RT through the reset control line LRT, potential at the floating diffusion node FD is reset by the potential of the reset power supply control line LVDDRT.

The floating diffusion node FD is connected to the gate of the amplifier transistor SF. The amplifier transistor SF is connected to a vertical signal line LVS and configured as a source follower circuit with a constant current source disposed outside the pixel unit 13. The amplifier transistor SF amplifies the potential at the floating diffusion node FD and outputs a voltage corresponding to the potential to the vertical signal line LVS. The voltage output from each pixel PX is output to the read signal processing unit 14, which is a signal reading circuit to read a signal from the pixel PX, through the vertical signal line LVS. The vertical signal line LVS, used here, is a type of signal line.

In FIG. 5, only one pixel, the pixel PX, is illustrated. However, the pixel unit 13 actually includes a plurality pixels arranged in matrix. In a pixel array of the pixel unit 13, the reset control line LRT, the transfer control line LTX, and the reset power supply control line LVDDRT are wired as a set for each row. The control circuit unit 16 drives the reset control line LRT, the transfer control line LTX, and the reset power supply control line LVDDRT.

The test signal output unit 12 includes an amplifier transistor for testing (test amplifier transistor) TSF, test signal input gate TFD, a power supply VDD, and the vertical signal line LVS.

The read signal processing unit 14 includes an analog amplifier 14a that processes a read signal and includes a column analog-to-digital (AD) convertor.

The test amplifier transistor TSF is connected between the power supply VDD and the vertical signal line LVS, and configured as a test output amplifier of a source follower circuit having a constant current source disposed outside the pixel unit 13. The test amplifier transistor TSF amplifies potential at the test signal input gate TFD and outputs a voltage corresponding to the potential to the vertical signal line LVS. The test amplifier transistor TSF may have the same configuration and constant number as the amplifier transistor SF, which serves as an output amplifier of the pixel PX of the pixel unit 13. The voltage output from the test signal generating unit 11 is input to the test signal input gate TFD as a test signal.

Figure 6A:
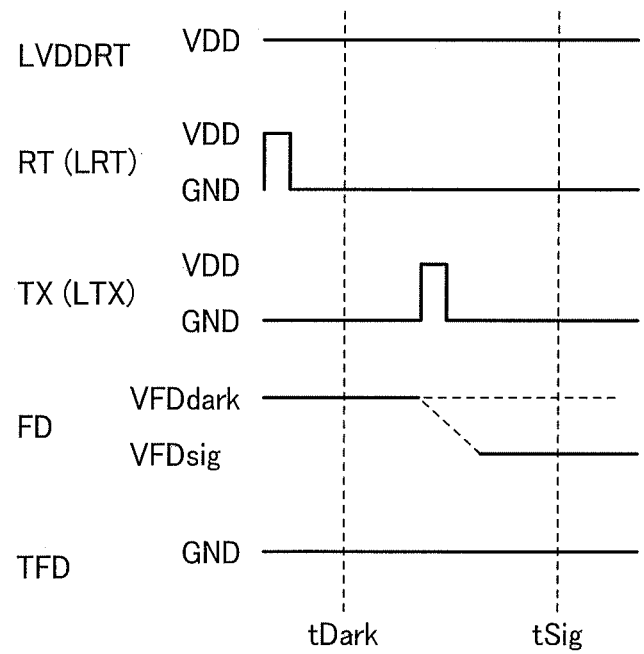
FIG. 6A is a timing chart illustrating operation timing associated with reading a signal from a pixel in the pixel unit in the circuit of FIG. 5.
Figure 6B:
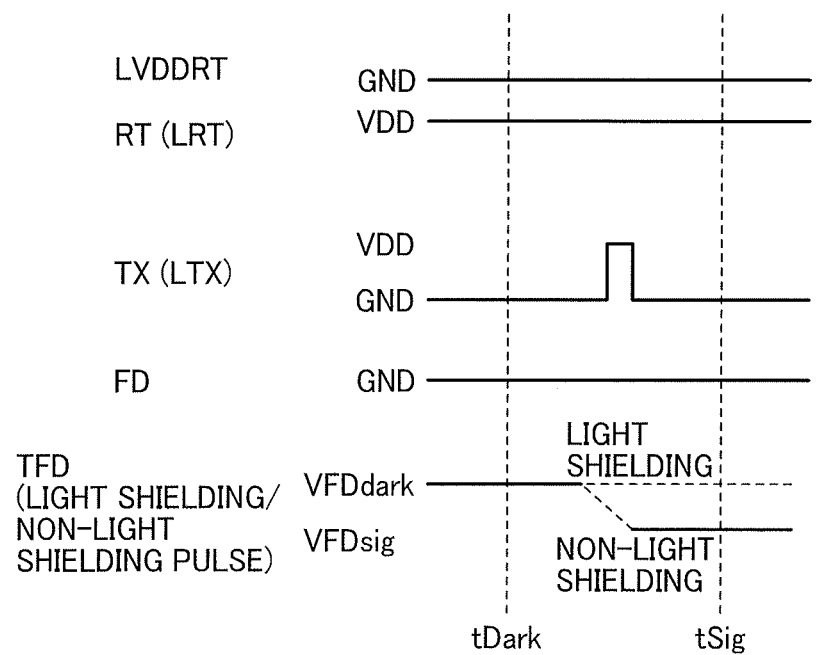
FIG. 6B is a timing chart illustrating operation timing associated with reading a signal from the test output amplifier of the test signal output unit in the circuit of FIG. 5.

FIG. 6A is a timing chart illustrating operation timing associated with reading a signal from a pixel PX of the pixel unit 13 in the circuit of FIG. 5. FIG. 6B is a timing chart illustrating operation timing associated with reading a signal from the test output amplifier of the test signal output unit 12 in the circuit of FIG. 5. A horizontal axis represents time in both FIG. 6A and FIG. 6B.

In each of FIG. 6A and FIG. 6B, operations of nodes, which are shown in the circuit diagram of FIG. 5, are individually illustrated. Additionally, in each of FIG. 6A and FIG. 6B, a time tDark indicates a time of reading a reset signal from the pixel PX of the pixel unit 13 (hereinafter, referred to as a reset signal reading time tDark) and a time tSig indicates a time of reading a pixel signal level of the pixel PX (hereinafter, referred to as a pixel signal level reading time tSig).

In reading a pixel output signal from the pixel PX of the pixel unit 13, the control circuit unit 16 sets the reset power supply control line LVDDRT to the voltage of the power supply VDD, as illustrated in FIG. 6A, thereby activating pixel reading operation related to the pixel PX of the pixel unit 13. Subsequently, the test signal generating unit 11 sets the test signal input gate TFD to ground (GND), thereby electrically disconnecting the test amplifier transistor TSF from the vertical signal line LVS in the test signal output unit 12, so that the output signal of the pixel PX of the pixel unit 13 is read out.

The reading operation of the output signal of the pixel PX is described in time series below.

The control circuit unit 16 sets a reset voltage that flows through the reset control line LRT to a high (H) level voltage of power supply VDD before the reset signal reading time tDark. Through this, a reset operation of resetting the reset transistor RT to a reset voltage VFDdark of the floating diffusion node FD is performed. At the reset signal reading time tDark, the amplifier transistor SF outputs the potential level VFDdark of the floating diffusion node FD reset by the reset voltage to the vertical signal line LVS, and then the potential level VFDdark is read out to the read signal processing unit 14.

The control circuit unit 16 sets the transfer transistor TX to the H level voltage of power supply VDD via the transfer control line LTX before the pixel signal level reading time tSig related to the pixel X, thereby charge-transferring electrons which are accumulated at the photoelectric conversion element PD to the floating diffusion node FD. Then, at the pixel signal level reading time tSig related to the pixel X, the amplifier transistor SF outputs to the vertical signal line LVS a voltage VFD that is a voltage of the signal level varied according to the number of charge-transferred electrons and a capacity of the floating diffusion node FD. That is, the pixel unit 13 reads out the signal to the read signal processing unit 14.

Testing an output from the test amplifier transistor T2SF of the test signal output unit 12 to the read signal processing unit 14 through the vertical signal line LVS is described with reference to FIG. 6B. The control circuit unit 16 grounds the reset power supply control line LVDDRT and sets the reset control line LRT to power supply VDD. Through this, the floating diffusion node FD is also grounded, and an input level of the amplifier transistor SF of the pixel PX becomes a low (L) level, and thereby the amplifier transistor SF and the vertical signal line LVS are electrically disconnected.

The test signal generating unit 11 generates a test signal of the voltage Vdark that is a voltage of the reset level of the floating diffusion node FD of the pixel PX (hereinafter, referred to as a reset level voltage Vdark, or simply a voltage Vdark) and a test signal of a voltage Vsig that is a voltage of the pixel signal level (hereinafter, referred to as a signal level voltage Vsig or simply a voltage Vsig). The test signals of the voltage Vdark and the voltage Vsig generated with the test signal generating unit 11 are input to the test signal input gate TFD. Then, in the test signal output unit 12, the output signal is read from the test amplifier transistor TSF to the vertical signal level LVS. The test amplifier transistor TSF of the test signal output unit 12, accordingly, becomes an output state to be tested.

Operation of reading the output signal from the test amplifier transistor TSF of the test signal output unit 12, which is caused by inputting the test signal generated with the test signal generating unit 11 to the test signal input gate TFD of the test signal outputting unit 12, is described in time series.

At the reset signal reading time tDark, the test signal generating unit 11 inputs the potential level of the floating diffusion node FD that is the potential VFDdark to the test signal input gate TFD. Then, the signal, which is output to the vertical signal line LVS from the test amplifier transistor, is read out to the read signal processing unit 14.

Before the pixel signal level reading time tSig related to the pixel PX, the test signal generating unit 11 inputs the voltage VFDsig that is the signal level of the floating diffusion node FD to the test signal input gate TFD. Additionally, the transfer transistor TX is once boosted up to the H level voltage of power supply VDD with the transfer control line LTX. However, the reset power control line LVDDRT is at the ground level and the reset control line LRT is at the H level due to the voltage VDD so that the floating diffusion node FD is at the ground level. This allows the transfer control line LTX to operate in the same way as the reading operation of the pixel PX without charge-transferring the electrons accumulated at the photoelectric conversion element PD to the floating diffusion node FD.

At the pixel signal reading time tSig related to the pixel PX, the test signal generating unit 11 inputs the voltage VFDsig that is a voltage of the signal level of the floating diffusion node FD to the test signal input gate TFD. Accordingly, the signal, which is output to the vertical signal line LVS from the test amplifier transistor TSF, is read out to the read signal processing unit 14. As described above, the control circuit unit 16 operates the read signal processing unit 14 based on the output timing of the pixel signal in reading both the pixel signal and the test signal, respectively from the pixel unit 13 and the test signal output unit 12.

Second Embodiment

Figure 7:
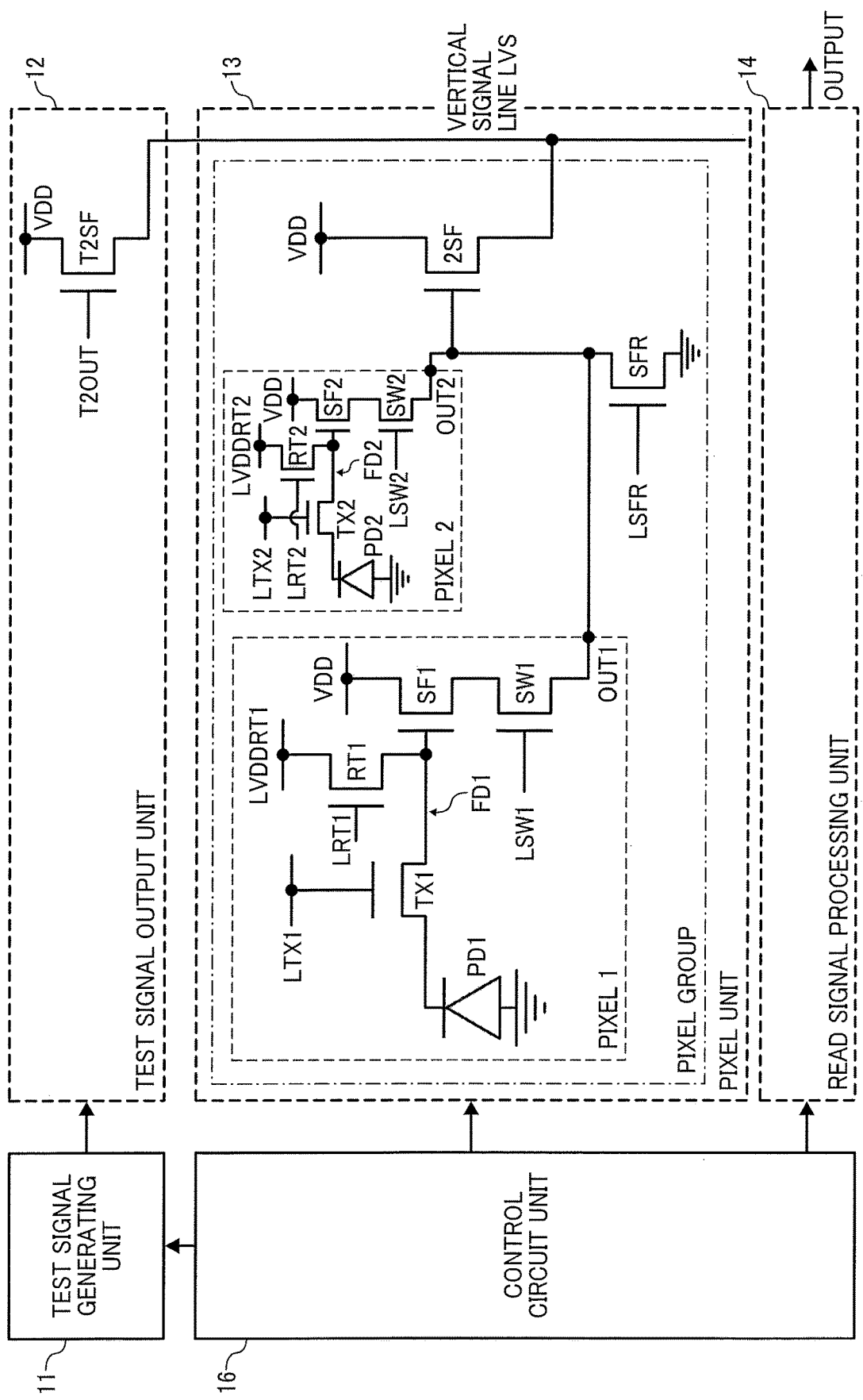
FIG. 7 is a block diagram illustrating a solid-state image sensor according to a second embodiment, in which a circuit configuration of an output amplifier of the test signal output unit in FIG. 4 and a circuit configuration of a pixel of the pixel unit in FIG. 4 are illustrated.

FIG. 7 is a block diagram illustrating a solid-state image sensor according to a second embodiment of the present disclosure, in which a circuit configuration of an output amplifier of a test signal output unit 12 in FIG. 4 and a circuit configuration of a pixel of a pixel unit 13 in FIG. 4 are illustrated. In FIG. 7, the same reference numerals are assigned to the corresponding components illustrated in FIG. 5. The pixel unit 13 includes a plurality of pixel groups. Circuit configurations of a pixel group of the pixel unit 13 and an output amplifier for testing (test output amplifier) of the test signal output unit 12 according to the second embodiment are individually described below. The pixel group of the pixel unit 13 includes a pixel 1, a pixel 2, a pixel output reset transistor SFR, a control line LSFR of the pixel output reset transistor SFR, and an amplifier transistor 2SF. The pixel unit 13 of the second embodiment has a serial processing unit in each pixel group. The serial processing unit sequentially outputs pixel signals from pixels in the pixel group in time series. In the pixel unit 13 having the serial processing unit in each pixel group, the pixel signals are read to a signal line on a pixel group basis.

The pixel output reset transistor SFR is connected between ground and each of a pixel output OUT1 of the pixel 1, a pixel output OUT2 of the pixel 2, and an input gate of the amplifier transistor 2SF. The amplifier transistor 2SF is connected between a power supply VDD and a vertical signal line LVS. The pixel 1 includes a photoelectric conversion element PD1, a transfer transistor TX1, a reset transistor RT1, an amplifier transistor SF1, a selection transistor SW1, and a floating diffusion node FD1. The pixel 1 further includes a power supply VDD, a control line LTX1 of the transfer transistor TX1, a control line LRT1 and a reset power supply control line LVDDRT1 of the reset transistor RT1, and a selection control line LSW1 of the selection transistor SW1.

The pixel 2 includes a photoelectric conversion element PD2, a transfer transistor TX2, a reset transistor RT2, an amplifier transistor SF2, a selection transistor SW2, and a floating diffusion node FD2. The pixel 2 further includes a power supply VDD, a control line LTX2 of the transfer transistor TX2, a control line LRT2 and a reset power supply control line LVDDRT2 of the reset transistor RT2, and a selection control line LSW2 of the selection transistor SW2.

In the pixel 1, the transfer transistor TX1 is connected between the photoelectric conversion element PD1, such as a photo diode, and the floating diffusion node FD1 serving as an output node. When the control circuit unit 16 applies a drive signal to the transfer control line LTX1, the transfer transistor TX1 transfers electrons that are photoelectrically converted at the photoelectric conversion element PD1 to the floating diffusion node FD1.

The reset transistor RT1 is connected between the reset power supply control line LVDDRT1 and the floating diffusion node FD1. When a drive signal for resetting is applied to the gate of the reset transistor RT1 through the reset control line LRT1, potential at the floating diffusion node FD1 is reset by potential of the reset power supply control line LVDDRT1. The floating diffusion node FD1 is connected to the gate of the amplifier transistor SF1.

The amplifier transistor SF1 is connected to the pixel output OUT1 via the selection transistor SW1 and configured as a source follower circuit with a constant current source disposed outside the pixel unit 13. The amplifier transistor SF1 amplifies the potential at the floating diffusion node FD1 and outputs a voltage corresponding to the potential to the pixel output OUT1.

The pixel 2 has the same circuit configuration as the pixel 1, and the amplifier transistor SF2 amplifies potential at the floating diffusion node FD2 and outputs a voltage corresponding to the potential to the pixel output OUT2. The amplifier transistor 2SF is connected to the vertical signal line LVS and configured as a source follower circuit with a constant current source disposed outside the pixel unit 13. The amplifier transistor 2SF amplifies the potential of each of the pixel output OUT1 and the pixel output OUT2, and serially outputs voltages corresponding to the potential to the vertical signal line LVS in time series, or performs serial output processing. The voltage output from each pixel group is output to the read signal processing unit 14, which is a signal reading circuit that reads a pixel signal, through the vertical signal line LVS.

In an array consisting of pixel 1 of the pixel group of the pixel unit 13, the reset control line LRT1, the transfer control line LTX1, the reset power supply control line LVDDRT1, and the selection control line LSW1 are wired as a set for each row. In an array of pixel 2 of the pixel group of the pixel unit 13, the reset control line LRT2, the transfer control line LTX2, the reset power supply control line LVDDRT2, and the selection control line LSW2 are wired as a set for each row. The control circuit unit 16 drives the reset control lines LRT1 and LRT2, the transfer control lines LTX1 and LTX2, the reset power supply control lines LVDDRT1 and LVDDRT2, and the selection control lines LSW1 and LSW2.

The test signal output unit 12 includes an amplifier transistor for testing (test amplifier transistor) T2SF, a test signal input gate T2OUT, a power supply VDD, and the vertical signal line LVS. The test amplifier transistor T2SF is connected between the power supply VDD and the vertical signal line LVS and configured as a source follower circuit with a constant current source disposed outside the pixel unit 13.

The test amplifier transistor TSF amplifies potential at the test signal input gate T2OUT and outputs a voltage corresponding to the potential to the vertical signal line LVS. The test amplifier transistor T2SF may have the same configuration and constant number as the amplifier transistor 2SF, which serves as an output amplifier of the pixel group of the pixel unit 13. The voltage output from the test signal generating unit 11 is input to the test signal input gate T2OUT as a test signal.

Figure 8:
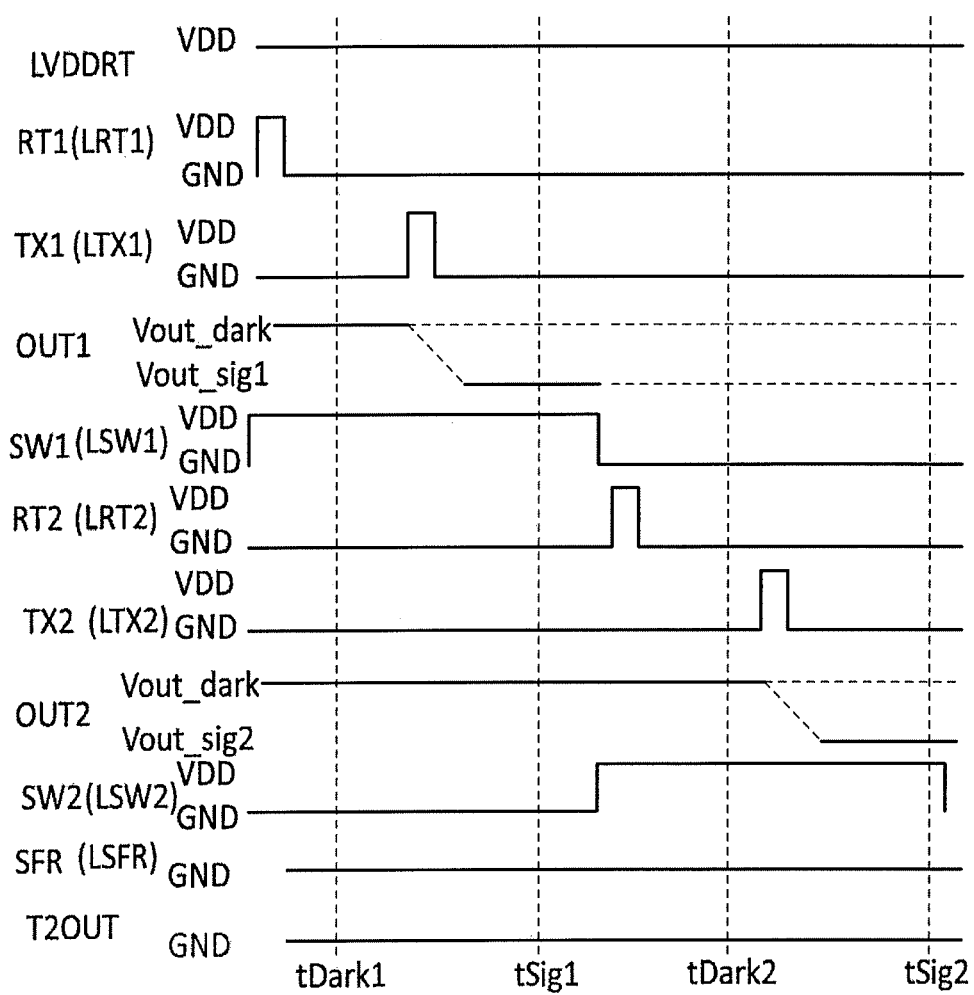
FIG. 8 is a timing chart illustrating operation timing associated with reading a signal from a pixel in the pixel unit of the circuit diagram of FIG. 7.
Figure 9:
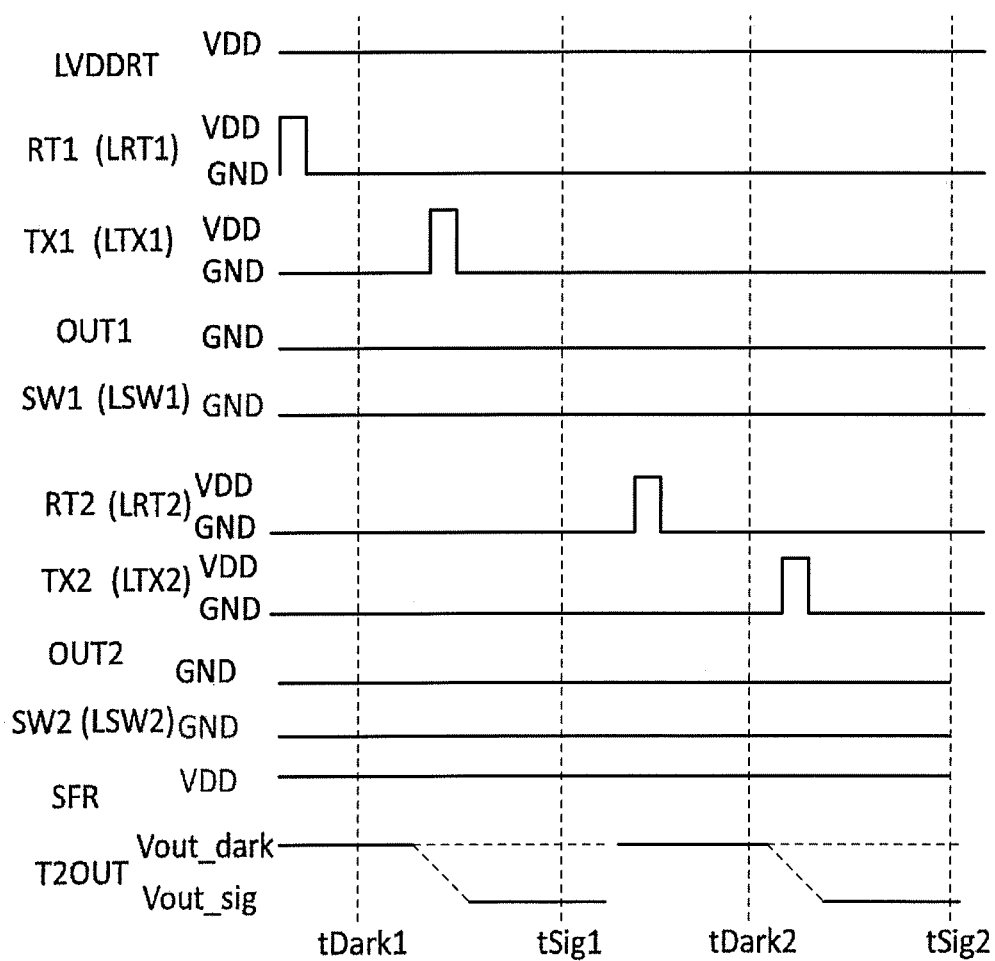
FIG. 9 is a timing chart illustrating operation timing associated with reading a signal from the test output amplifier of the test signal output unit in the circuit diagram of FIG. 7.

FIG. 8 is a timing chart illustrating operation timing associated with reading a signal from a pixel in the pixel unit 13 of the circuit of FIG. 7. FIG. 9 is a timing chart illustrating operation timing associated with reading a signal from the test output amplifier of the test signal output unit 12 in the circuit of FIG. 7. In each of FIG. 8 and FIG. 9, operations of nodes, which are shown in the circuit diagram of FIG. 7, are individually illustrated and horizontal axis represents time. In each of FIG. 8 and FIG. 9, a time tDark1 indicates a time of reading a reset signal from the pixel 1 of the pixel group of the pixel unit 13 (hereinafter, referred to as a reset signal reading time tDark1) and a time tSig1 indicates a time of reading a pixel signal level of the pixel 1 (hereinafter, referred to as a signal level reading time tSig1). Additionally, in each of FIG. 8 and FIG. 9, a time tDark2 indicates a time of reading a reset signal from the pixel 2 (hereinafter, referred to as a reset signal reading time tDark2) and a time tSig2 indicates a time of reading a pixel signal level of the pixel 2 (hereinafter, referred to as a signal level reading time tSig2).

In reading a pixel output signal from a pixel of the pixel group of the pixel unit 13, the control circuit unit 16 sets the reset power supply control line LVDDRT1 and the selection transistor SW1 to the H level voltage of power supply VDD. This activates reading operation of the pixel 1 of the pixel group of the pixel unit 13. Subsequently, the test signal generating unit 11 grounds the test signal input gate T2OUT, and thereby electrically disconnecting the test amplifier transistor T2SF from the vertical signal line LVS in the test signal output unit 12, resulting in reading out of the signal from the pixel 1 of the pixel unit 13.

The control circuit unit 16 switches a connection of the selection control line LSW1 of the selection transistor SW1 from the power supply VDD to the ground and a connection of the selection control line LSW2 of the selection transistor SW2 from the ground to the power supply VDD, and thereby activating an reading operation to sequentially read pixels in the pixel group in time series. The reading operation of reading the output signal of the pixel 1 and the pixel 2 in the pixel group is described in time series below.

The processing of reading the pixel 1 is described in time series with reference to FIG. 8. The control circuit unit 16 sets the reset control line LRT1 to the H level voltage of power supply VDD before the reset signal reading time tDark1. The reset transistor RT1, accordingly, becomes a reset voltage Vout_dark that is a reset voltage of the floating diffusion node FD1 due to the reset operation.

At the reset signal reading time tDark1, the amplifier transistor SF1 outputs the potential level Vout_dark of the floating diffusion node FD1 reset with the reset voltage to the pixel output OUT1. The output of the pixel output OUT1 is read out to the read signal processing unit 14 from the amplifier transistor 2SF through the vertical signal line LVS, as an input signal. The control circuit unit 16 sets the transfer transistor TX1 to the H level of the voltage VDD via the transfer control line LTX1 before the pixel signal level reading time tSig1. Through this, electrons accumulated at the photoelectric conversion element PD1 are charge-transferred to the floating diffusion node FD1.

At the pixel signal level reading time tSig1, the amplifier transistor SF1 outputs to the pixel output OUT1 a voltage Vout_Sig1 that is a voltage of the signal level varied according to the number of charge-transferred electrons and a capacity of the floating diffusion node FD1. The output of the pixel output OUT1 is read out to the read signal processing unit 14 from the amplifier transistor 2SF through the vertical signal line LVS, as an input signal.

Subsequently, the control circuit unit 16 switches a control line, which controls reading operation, from the control line LRT1 of the reset transistor RT1 of the pixel 1 to the control line LRT2 of the reset transistor RT2 of the pixel 2. The control circuit unit 16 also changes from the control line LTX1 of the transfer transistor TX1 to the control line TX2 of the transfer transistor TX2. By changing the control lines that control the reading operation, the potential Vout_dark of the pixel signal reset signal of the pixel 2 and the potential Vout_sig2 of the pixel signal level of the pixel 2 are input to the amplifier transistor 2SF in the pixel group. Through this, the amplifier transistor 2SF outputs the pixel signal to the vertical signal line LVS.

Testing an output from the test amplifier transistor T2SF of the test signal output unit 12 to the read signal processing unit 14 through the vertical signal line LVS is described. The control circuit unit 16 connects the control line LSW1 of the selection transistor SW1 of the pixel 1 and the control line LSW2 of the selection transistor SW2 of the pixel 2 to the ground, and sets the control line LSFR of the pixel output reset transistor SFR to the H level voltage of power supply VDD. The pixel outputs OUT1 and OUT2 are connected to the ground, accordingly. Through this, the input of the amplifier transistor 2SF of the pixel group becomes the L level, and thus the amplifier transistor 2SF and the vertical signal line LVS are electrically disconnected.

The test signal generating unit 11 inputs test signals of the reset level voltage Vout_dark and the pixel signal level voltage Vout_sign to the test signal input gate T2OUT. Then, the test amplifier transistor T2SF of the test signal output unit 12 outputs the signal to the vertical signal level LVS. The test amplifier transistor T2SF of the test signal output unit 12, accordingly, becomes an output state to be tested.

The operation of inputting the signal generated with the test signal generating unit 11 to the test signal input gate T2OUT of the test signal outputting unit 12 and reading the signal from the test amplifier transistor T2SF of the test signal output unit 12 is described in time series with reference to FIG. 9. Before the reset signal reading time tDark1, the control circuit unit 16 once boosts the reset control line LRT1 up to the H level voltage with the power supply VDD at an operation timing of reading the pixel 1 of the pixel group. With this boost of the reset control line LRT1, the reset transistor RT1 operates in the same way as the reset transistor RT1 operates in the pixel signal reading operation.

At the reset signal reading time tDark1, the test signal generating unit 11 inputs the potential Vout_dark, which is an output of the amplifier transistor SF1 when the floating diffusion node FD1 of the pixel 1 is the reset level, to the test signal input gate T2OUT. Then, the test amplifier transistor T2SF outputs the signal to the vertical signal line LVS, and the signal is read to the read signal processing unit 14 through the vertical signal line LVS.

Before the pixel signal level reading time tSig1, the test signal generating unit 11 inputs, to the test signal input gate T2OUT, the voltage Vout1_sig, which is a voltage output from the amplifier transistor SF1 to which the pixel signal level of the floating diffusion node FD1 is input. The control circuit unit 16 once boosts the transfer control line LTX1 up to the H level voltage with the power supply VDD, and thus the transfer transistor TX1 operates in the same way as the transfer transistor TX1 operates in the pixel signal reading operation.

At the pixel signal level reading time tSig1, the test signal generating unit 11 inputs, to the test signal input gate T2OUT, the potential Vout_sig, which is an output of the amplifier transistor SF1 to which the pixels signal level of the floating diffusion node FD1 is input. Then, the test amplifier transistor T2SF outputs the signal to the vertical signal line LVS, and the signal is read to the read signal processing unit 14 through the vertical signal line LVS.

Subsequently, the control circuit unit 16 switches a control line, which controls reading operation, from the control line LRT1 of the reset transistor RT1 of the pixel 1 to the control line LRT2 of the reset transistor RT2 of the pixel 2. The control circuit unit 16 also changes from the control line LTX1 of the transfer transistor TX1 to the control line TX2 of the transfer transistor TX2.

At the reset signal reading time tDark2, the test signal generating unit 11 inputs, to the test signal input gate T2OUT, the potential Vout_dark that is an output of the amplifier transistor SF2 when the floating diffusion node FD2 of the pixel 2 is the reset level. Then, the test amplifier transistor T2SF outputs the signal to the vertical signal line LVS, and the signal is read to the read signal processing unit 14 through the vertical signal line LVS.

At the pixel signal level reading time tSig2, the test signal generating unit 11 inputs, to the test signal input gate T2OUT, the potential Vout_sig that is an output of the amplifier transistor SF2 to which the pixel signal level of the floating diffusion node FD2 is input. Then, the test amplifier transistor T2SF outputs the signal to the vertical signal line LVS, and the signal is read to the read signal processing unit 14 through the vertical signal line LVS.

Third Embodiment

Figure 10:
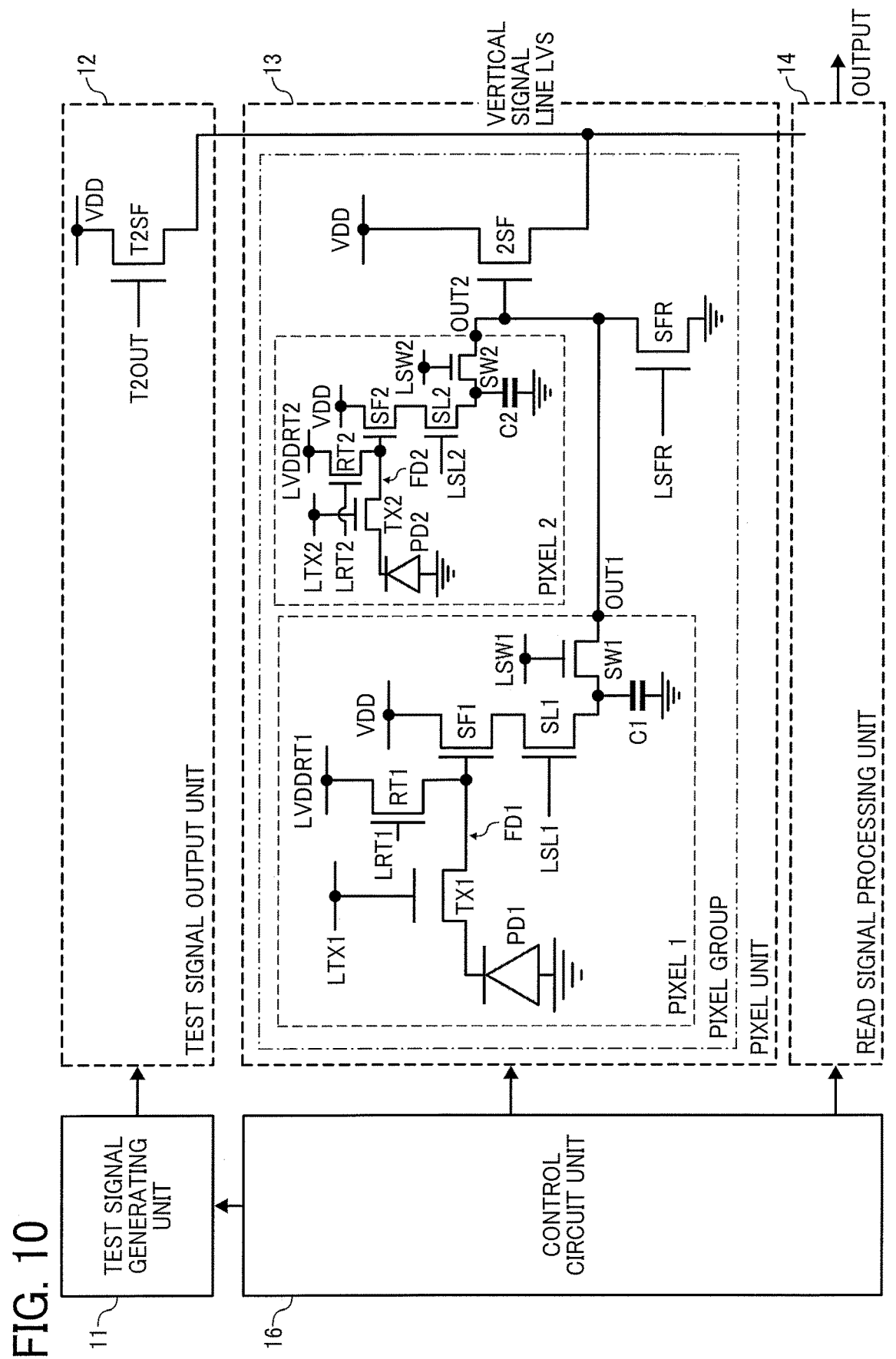
FIG. 10 is a block diagram illustrating a solid-state image sensor according to a third embodiment, in which a circuit configuration of an output amplifier of the test signal output unit in FIG. 4 and a circuit configuration of a pixel in the pixel unit in FIG. 4 are illustrated.

FIG. 10 is a block diagram illustrating a solid-state image sensor according to a third embodiment of the present disclosure, in which a circuit configuration of an output amplifier of a test signal output unit 12 in FIG. 4 and a circuit configuration of a pixel in the pixel unit 13 in FIG. 4 is illustrated. In FIG. 10, the same reference numerals are assigned to the corresponding components as illustrated in FIG. 5. The pixel unit 13 includes a plurality of pixel groups. Circuit configurations of the pixel group of the pixel unit 13 and the test output amplifier of the test signal output unit 12 of FIG. 10 are individually described.

A pixel group of a pixel unit 13 includes a pixel 1, a pixel 2, a pixel output reset transistor SFR, a control line LSFR of a pixel output reset transistor SFR, and an amplifier transistor 2SF. The pixel output reset transistor SFR is connected between ground and each of a pixel output OUT1 of the pixel 1, a pixel output OUT2 of the pixel 2, and an input gate of the amplifier transistor 2SF. The amplifier transistor 2SF is connected between a power supply VDD and a vertical signal line LVS.

The pixel 1 includes a photoelectric conversion element PD1, a transfer transistor TX1, a reset transistor RT1, an amplifier transistor SF1, a memory transfer transistor SL1, memory capacitor C1, a selection transistor SW1, and a floating diffusion node FD1. The pixel 1 further includes a power supply VDD, a control line LTX1 of the transfer transistor TX1, a control line LRT1 of the reset transistor RT1, and a reset power supply control line LVDDRT1 of the reset transistor RT1. The pixel 1 also includes a memory selection control line LSL1 of the memory transfer transistor SL1 and a selection control line LSW1 of the selection transistor SW1.

The pixel 2 includes a photoelectric conversion element PD2, a transfer transistor TX2, a reset transistor RT2, an amplifier transistor SF2, a memory transfer transistor SL2, memory capacitor C2, a selection transistor SW2, and a floating diffusion node FD2. The pixel 2 further includes a power supply VDD, a control line LTX2 of the transfer transistor TX2, a control line LRT2 of the reset transistor RT2, and a reset power supply control line LVDDRT2 of the reset transistor RT2. The pixel 2 also includes a memory selection control line LSL2 of the memory transfer transistor SL2 and a selection control line LSW2 of the selection transistor SW2.

In the pixel 1, the transfer transistor TX1 is connected between the photoelectric conversion element PD1, such as a photo diode, and the floating diffusion node FD1 serving as an output node. When the control circuit unit 16 applies a drive signal to the transfer control line LTX1, the transfer transistor TX1 transfers electrons that are photoelectrically converted at the photoelectric conversion element PD1 to the floating diffusion node FD1.

The reset transistor RT1 is connected between the reset power supply control line LVDDRT1 and the floating diffusion node FD1. When a drive signal for resetting is applied to the gate of the reset transistor RT1 through the reset control line LRT1, potential at the floating diffusion node FD1 is reset by potential of the reset power supply control line LVDDRT1. The floating diffusion node FD1 is connected to the gate of the amplifier transistor SF1.

The amplifier transistor SF1 is connected to the memory capacitor C1 via the memory selection transistor SL1 and configured as a source follower circuit with a constant current source disposed outside the pixel unit 13. The amplifier transistor SF1 amplifies the potential at the floating diffusion node FD1 and stores a voltage corresponding to the potential in the memory capacitor C1. The selection transistor SW1 is connected to the memory capacitor C1 and the pixel output OUT1. The selection transistor SW1 outputs the voltage stored in the memory capacitor C1 to the pixel output OUT1.

The pixel 2 has the same circuit configuration as the pixel 1 and outputs a voltage to the pixel output OUT2 in the same way as pixel 1. The amplifier transistor 2SF is connected to the vertical signal line LVS and configured as an output amplifier of a source follower circuit having a constant current source disposed outside the pixel unit 13. The amplifier transistor 2SF amplifies the potential of each of the pixel output OUT1 and the pixel output OUT2, and serially outputs voltages corresponding to the potential to the vertical signal line LVS in time series, or performs serial output processing.

The voltage output from each pixel group is output to the read signal processing unit 14, which is a signal reading circuit that reads a pixel signal, through the vertical signal line LVS. In an array of pixel 1 of the pixel group of the pixel unit 13, the reset control line LRT1, the transfer control line LTX1, the reset power supply control line LVDDRT1, and the selection control line LSW1 are wired as a set for each row.

In an array of pixel 2 of the pixel group of the pixel unit 13, the reset control line LRT2, the transfer control line LTX2, the reset power supply control line LVDDRT2, and the selection control line LSW2 are wired as a set for each row. The control circuit unit 16 drives the reset control lines LRT1 and LRT2, the transfer control lines LTX1 and LTX2, the reset power supply control lines LVDDRT1 and LVDDRT2, memory selection control lines LSL1 and LSL2, and selection control lines LSW1 and LSW2.

The test signal output unit 12 includes an amplifier transistor for testing (test amplifier transistor) T2SF, a test signal input gate T2OUT, a power supply VDD, and the vertical signal line LVS. The test amplifier transistor T2SF is connected between the power supply VDD and the vertical signal line LVS and configured as a source follower circuit with a constant current source disposed outside the pixel unit 13. The test amplifier transistor T2SF amplifies potential at the test signal input gate T2OUT and outputs a voltage corresponding to the potential to the vertical signal line LVS.

The test amplifier transistor T2SF may have the same configuration and constant number as the amplifier transistor 2SF, which serves as an output amplifier of the pixel group of the pixel unit 13. The voltage output from the test signal generating unit 11 is input to the test signal input gate T2OUT as a test signal.

Figure 11A:
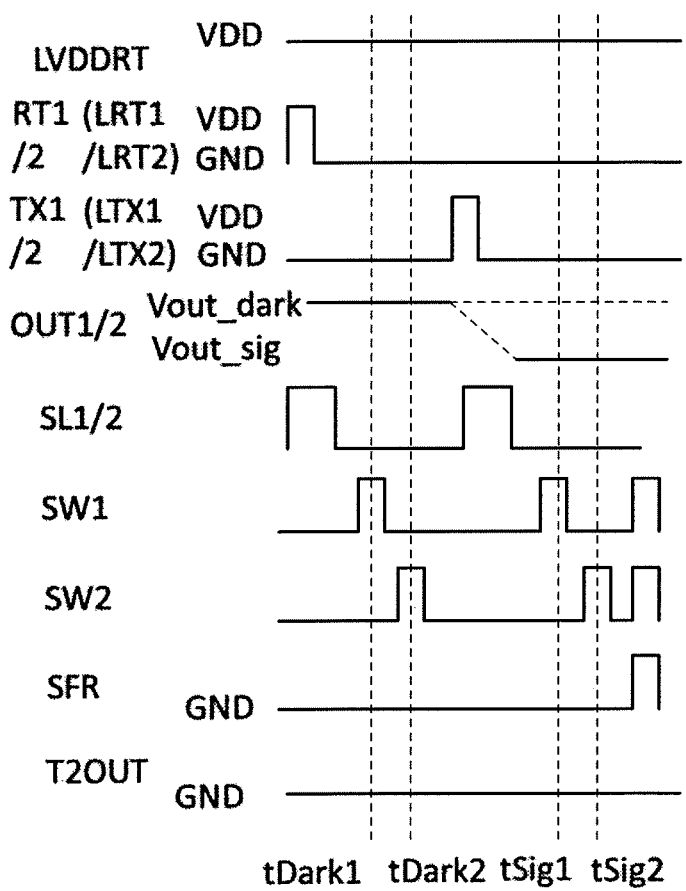
FIG. 11A is a timing chart illustrating operation timing associated with reading a signal from a pixel in the pixel unit of the circuit diagram of FIG. 10.
Figure 11B:
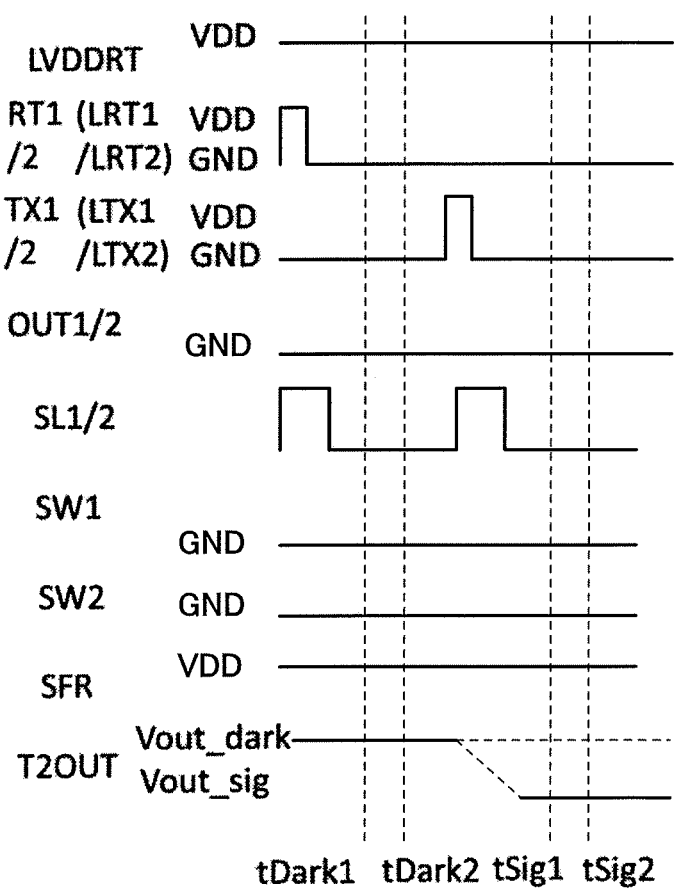
FIG. 11B is a timing chart illustrating operation timing associated with reading a signal from the test output amplifier of the test signal output unit of the circuit diagram of FIG. 10.

FIG. 11A is a timing chart illustrating operation timing associated with reading a signal from a pixel in the pixel unit 13 in the circuit diagram of FIG. 10. FIG. 11B is a timing chart illustrating operation timing associated with reading a signal from the test output amplifier of the test signal output unit 12 of the circuit diagram of FIG. 10.

In FIG. 11A and FIG. 11B, operations of nodes, which are shown in the circuit diagram of FIG. 10, are individually illustrated and a horizontal axis represents time. In each of FIG. 11A and FIG. 11B, a time tDark1 indicates a time of reading a reset signal (hereinafter, referred to as a reset signal reading time tDark1) from the pixel 1 of the pixel group of the pixel unit 13 and a time tSig1 indicates a time of reading a pixel signal level of the pixel 1 (hereinafter, referred to as a signal level reading time tSig1). Additionally, in each of FIG. 11A and FIG. 11B, a time tDark2 indicates a time of reading a reset signal from the pixel 2 (hereinafter, referred to as a reset signal reading time tDark2) and a time tSig2 indicates a time of reading a pixel signal level of the pixel 2 (hereinafter, referred to as a signal level reading time tSig2).

The operation of reading the pixel output signal from the pixel in the pixel group of the pixel unit 13 is described with reference to FIG. 11A. The control circuit unit 16 sets the reset power supply control line LVDDRT and the selection control line LSW1 of the selection transistor SW1 to the H level voltage of power supply VDD, and thereby activating the pixel reading operation related to the pixel 1 of the pixel group of the pixel unit 13. Subsequently, the test signal generating unit 11 grounds the test signal input gate T2OUT, and thereby electrically disconnecting the test amplifier transistor T2SF from the vertical signal line LVS in the test signal output unit 12, and thus the output signal from the pixel 1 of the pixel unit 13 is read out.

After controlling reading of pixel signal of the pixel 1, the control circuit unit 16 switches a connection of the selection control line LSW1 of the selection transistor SW1 from the power supply VDD to the ground, and then a connection of the selection control line LSW2 of the selection transistor SW2 from the ground to the power supply VDD. This activates operation of reading from the pixels in the pixel group serially in time series.

The operation of reading the output signal from the pixel 1 and the pixel 2 in the pixel group is described below. The control circuit unit 16 resets the potential at the floating diffusion nodes FD1 and FD2 before the reset signal reading time tDark1. The control circuit unit 16 sets each of the reset control lines LRT1 and LRT2 and each of the memory selection control lines LSL1 and LSL2 to H level voltage of power supply VDD, and thereby resetting the reset transistors RT1, RT2, and the memory selection transistors SL1 and SL2. At the same time, each output voltage corresponding to the reset level output from the amplifier transistors SF1 and SF2 is transferred to the corresponding one of the memory capacitor C1 and the memory capacitor C2 so that each memory can be reset.

Subsequently, the control circuit unit 16 connects the reset control line LRT1 of the reset transistor RT1 and the reset control line LRT2 of the reset transistor RT2 to the ground, which is the L level. The control circuit unit 16 then also connects the memory selection control line LSL1 of the memory selection transistor SL1 and the memory selection control line LSL2 of the memory selection transistor SL2 to the ground that is the L level. Through this, each output reset level voltage Vout_dark from the corresponding one of the amplifier transistors SF1 and SF2 is stored in the memory capacitor C1 and the memory capacitor C2, respectively.

The control circuit unit 16 boosts the control line LSW1 of the selection transistor SW1 up to the H level voltage of power supply VDD. The control circuit unit 16 connects the control line LSW1 of the selection transistor SW1 to the ground that is the L level, and boosts the control line LSW2 of the selection transistor SW up to the H level voltage of power supply VDD. Through this, the pixel output OUT2 of the pixel 2 is read and a signal is output from the amplifier transistor 2SF to the read signal processing unit 14 through the vertical signal line LVS.

The control circuit unit 16 sets the transfer control line LTX1 of the transfer transistor TX1 and the transfer control line LTX2 of the transfer transistor TX2 to the H level voltage with the power supply VDD. The control circuit unit 16 also sets the memory selection control line LSL1 of the memory selection transistor SL1 and the memory selection control line LSL2 of the memory selection transistor SL2 to the H level voltage with the power supply VDD. Through this, electrons are charge-transferred from the photoelectric conversion elements PD1 and PD2 to the floating diffusion nodes FD1 to FD2, respectively. Each output voltage corresponding to each signal level from the amplifier transistors SF1 and SF2 is transferred to and stored in the corresponding one of the memory capacitor C1 and the memory capacitor C2. According to this embodiment, the pixel signal from each pixel in the pixel group is stored in the memory capacitor in each pixel as described above.

Subsequently, the control circuit unit 16 connects the transfer control line LTX1 of the transfer transistor TX1 and the transfer control line LTX2 of the transfer transistor TX2 to the ground that is the L level. The control circuit unit 16 then connects the memory selection control line LSL1 of the memory selection transistor SL1 and the memory selection control line LSL2 of the memory selection transistor SL2 to the ground that is the L level. Through this, the output voltage Vout_sig of the signal level of the amplifier transistors SF1 and SF2 is stored in the memory capacitor C1 and the memory capacitor C2.

The control circuit unit 16 boosts the control line LSW1 of the selection transistor SW1 up to the H level voltage of power supply VDD at the pixel signal level reading time t Sig1. The control circuit unit 16 connects the control line LSW1 of the selection transistor SW1 to the ground of L level, and boosts the control line LSW2 of the selection transistor SW2 up to the power supply VDD of H level. Through this, an output signal of the pixel output OUT2 of the pixel 2 is read from the amplifier transistor 2SF to the read signal processing unit 14 through the vertical signal line LVS.

Now, operation in testing an output from the test amplifier transistor T2SF of the test signal output unit 12 to the read signal processing unit 14 through the vertical signal line LVS is described with reference to FIG. 11B. The control circuit unit 16 connects the selection control line LSW1 of the selection transistor SW1 of the pixel 1 and the selection control line LSW2 of the selection transistor SW2 to the ground, and sets the control line LSFR of the pixel output reset transistor SFR to the H level voltage of power supply VDD, and thereby connecting the pixel outputs OUT1 and OUT2 to the ground. Through this, the input of the amplifier transistor 2SF of the pixel group becomes the L level and the amplifier transistor 2SF and the vertical signal line LVS are electrically disconnected.

The test signal generating unit 11 generates a test signal of the reset level voltage Vout_dark that is a voltage of the reset level of each of the pixel outputs OUT1 and the OUT2 and a test signal of a voltage Vsig that is a voltage of the pixel signal level. The test signal voltages V_dark and the voltage V_sig are input to the test signal input gate T2OUT. Then, the test amplifier transistor T2SF of the test signal output unit 12 outputs the signal to the vertical signal level LVS. Through this, the test amplifier transistor T2SF of the test signal output unit 12 enters in an output state to be tested.

The operation of inputting the signal generated with the test signal generating unit 11 to the test signal input gate T2OUT of the test signal outputting unit 12 and reading the signal from the test amplifier transistor T2SF of the test signal output unit 12 is described in time series below. Before the reset signal reading time tDark1, the test signal generating unit 11 generates and inputs the pixel output reset level Vout_dark to the input gate T2OUT of the test signal input gate of the test signal output unit 12.

Regarding the pixel unit 13, the control circuit unit 16 sets the reset control line LRT1 of the reset transistor and the reset control line LRT2 of the reset transistor RT2 to the H level voltage of power supply VDD in the same way as the reading operation of the output signal. The control circuit unit 16 also sets the memory selection control line LSL1 of the memory selection transistor SL1 and the memory selection control line LSL2 of the memory selection transistor SL2 to the H level voltage of power supply VDD. Through this, the pixel unit 13 resets the potential of the floating diffusion nodes FD1 and FD2 to the reset potential. At the same time, each output voltage corresponding to the reset level of the corresponding one of the amplifier transistors SF1 and SF2 is transferred to the corresponding one of the memory capacitor C1 and the memory capacitor C2 so that each memory is reset.

The control circuit unit 16 then connects the reset control line LRT1 of the reset transistor RT1 and the reset control line LRT2 of the reset transistor RT2 to the ground that is the L level. The control circuit unit 16 then connects the memory selection control line LSL1 of the memory selection transistor SL1 and the memory selection control line LSL2 of the memory selection transistor SL2 to the ground that is the L level. Through this, the output voltage Vout_dark from each of the amplifier transistors SF1 and SF2 is stored in the corresponding one of the memory capacitor C1 and the memory capacitor C2.

At the reset signal reading time tDark1 and the reset signal reading time tDark2, the test signal generating unit 11 generates and inputs the output voltage Vout_dark to the test signal input gate 2OUT of the test signal output unit 12. Then, the test amplifier transistor T2SF outputs the signal to the vertical signal line LVS, and the signal is read to the read signal processing unit through the vertical signal line LVS.

Subsequently, before the pixel signal level reading time tSig1, the pixel output level voltage Vout_sig generated with the test signal generating unit 11 is input to the test signal input gate T2OUT of the test signal output unit 12.

Regarding the pixel unit 13, in the same way as reading of output signals, the control circuit unit 16 sets the transfer control line LTX1 of the transfer transistor TX1 the transfer control line LTX2 of the transfer transistor TX2 to the H level voltage of power supply VDD. The control circuit unit 16 also sets the memory selection control line LSL1 of the memory selection transistor SL1 and the memory selection control line LSL2 of the memory selection transistor SL2 to the H level voltage of power supply VDD. Through this, electrons are charge-transferred from the photoelectric conversion elements PD1 and PD2 to each of the floating diffusion nodes FD1 and FD2. At the same time, the output voltage corresponding to the signal level of each of the amplifier transistors SF1 and SF2 is stored in the corresponding one of the memory capacitors C1 and C2.

Subsequently, the control circuit unit 16 connects the transfer control line LTX1 of the transfer transistor TX1 and the transfer control line LTX2 of the transfer transistor TX2 to the ground that is the L level. The control circuit unit 16 then also connects the memory selection control line LSL1 of the memory selection transistor SL1 and the memory selection control line LSL2 of the memory selection transistor SL2 to the ground that is the L level. Through this, the output voltage Vout_sig of the signal level of each of the amplifier transistors SF1 and SF2 is stored in the corresponding one of the memory capacitor C1 and the memory capacitor C2.

Subsequently, at the pixel signal reading time tDark1 and the reset signal reading time tDark2, the pixel output level voltage Vout_sig generated with the test signal generating unit 11 is input to the test signal input gate T2OUT of the test signal output unit 12. Then, the test amplifier transistor T2SF outputs the signal to the vertical signal line LVS, and the signal is read to the read signal processing unit through the vertical signal line LVS.

Specific Examples of Circuit Configurations of Test Signal Generating Unit and Test Signal Output Unit FIG. 12 is a block diagram illustrating circuit configurations of the test signal generating unit 11 and the test signal output unit 12, according to a first example in the case of generating a test pattern in a column direction. In FIG. 12, in addition to the example configurations of the test signal generating unit 11 and the test signal output unit 12 for evaluating variation of output signal level of white in a black background, the control circuit unit 16, the pixel unit 13, and the read signal processing unit 14 are illustrated. The control circuit unit 16, the pixel unit 13, and the read signal processing unit 14 each has the same circuit configuration as the corresponding components illustrated in FIG. 5.

In FIG. 12, a vertical signal line LVS for one of a set of successive columns from 1 to k and a set of successive columns from m+1 to n is defined as a light shielding group (or light shielding part), and the vertical signal lines LVS for a set of successive columns from k+1 to m is defined as a non-light shielding group (or non-light shielding part). Here, k, m, and n are integer numbers, and n>m>k>0. Accordingly, in this description, successive signal lines are the light shielding group and one or more signal lines other than the successive signal lines of the light shielding group are the non-light shielding group.

The test signal generating unit 11 inputs a light shielding pulse to the test signal input gate TFD of the test amplifier transistor TSF that is connected to the vertical signal line LVS of the light shielding groups, which are the columns from 1 to k and the columns from m+1 to n in the test signal output unit 12. The test signal generating unit 11 inputs a non-light shielding pulse to the test signal input gate TFD of the test amplifier transistor TSF connected to the vertical signal line LVS of the non-light shielding group, which is the columns from k+1 to m.

The light shielding pulse and the non-light shielding pulse are synchronized with the time tDark at which a reset level signal output form a pixel of the pixel unit 13 is read, and the pixel signal level reading time tSig. With the light shielding pulse, the reset level voltage Vdark is usually applied, and with the non-light shielding pulse, the reset level voltage Vdark is applied at the time tDark and then lowered to the voltage Vsig right before the time tSig. The voltage Vdark and the voltage Vsig are generated based on a reference voltage Vre that is provided to the test signal generating unit 11 from the inside or the outside.

FIG. 13 is a block diagram illustrating circuit configurations of the test signal generating unit 11 and the test signal output unit 12, according to a second example in the case of generating a test pattern in a column direction. In the second example illustrated in FIG. 13, the test signal generating unit 11 provides the voltages Vdark and Vsig to the test signal output unit 12.

The test signal generating unit 11 includes input voltage switches SWV each of which is arranged corresponding to the test signal input gate TFD of the test amplifier transistor TSF corresponding to each vertical signal line LVS of the test signal output unit 12. The input voltage switch SWV switches an input voltage according to one of the light shielding signal pulse and the non-light shielding signal pulse. Each input voltage switch SWV is controlled by the control circuit unit 16 using the light shielding signal pulse or the non-light shielding signal pulse.

When the light shielding signal pulse or the non-light shielding signal pulse is at the H level, the input voltage switch SWV switches the input voltage in a manner that the potential of the reset level voltage Vdark generated with the test signal generating unit 11 is applied to the test signal input gate TFD of the test amplifier transistor TSF. When the light shielding signal pulse or the non-light shielding signal pulse is at the L level, the input voltage switch SWV switches the input voltage in a manner that the potential of the signal level voltage Vsig generated with the test signal generating unit 11 is applied to the test signal input gate TFD of the test amplifier transistor TSF.

Accordingly, the voltage Vdark is input to the test signal input gate TFD of each test amplifier transistor TSF corresponding to the vertical signal line LVS of one of the light shielding groups each of which is the columns from 1 to k or the columns from m+1 to n, because a signal of H level is normally input to the input voltage switch SWV due to the light shielding pulse. Additionally, the voltage Vdark is input to the test signal input gate TFD of the test amplifier transistor TSF corresponding to the vertical signal line LVS of the non-light shielding group of the columns from k+1 to m because, a signal of H level is normally input to the input voltage switch SWV due to the non-light shielding pulse. At the time tSig, the signal of L level is input, and the voltage Vsig is input, accordingly.

FIG. 14 is a diagram illustrating circuit configurations of the test signal generating unit 11 and the test signal output unit 12, according to a third example in the case of generating a test pattern in a column direction. In the third example illustrated in FIG. 14, the test signal generating unit 11 provides the light shielding pulse or the non-light shielding pulse of one of the voltage Vdark or the voltage Vsig to the test signal output unit 12.

The test signal generating unit 11 includes pulse switches SWP each of which is arranged corresponding to the test signal input gate TFD of the test amplifier transistor TSF corresponding to each vertical signal line LVS of the test signal output unit 12. The pulse switch SWP switches an input pulse according to one of a light shielding signal and a non-light shielding signal. Each pulse switch SWP is controlled by the control circuit unit 16 using the light shielding signal or the non-light shielding signal.

When the light shielding signal or the non-light shielding signal is at the H level, the pulse switch SWP switches in a manner that the light shielding pulse generated with the test signal generating unit 11 is applied to the test signal input gate TFD of the test amplifier transistor TSF. When the light shielding signal or the non-light shielding signal is at the H level, the pulse switch SWP switches in a manner that the non-light shielding pulse generated with the test signal generating unit 11 is applied to the test signal input gate TFD of the test amplifier transistor TSF.

A light shielding signal of H level is normally applied to the pulse switch SWP corresponding to the test signal input gate TFD of the test amplifier transistor TSF corresponding to the vertical signal line LVS of one of the light shielding groups each of which is the columns from 1 to k or the columns from m+1 to n, and thereby the light shielding pulse is input to the test signal input gate TFD. The light shielding pulse is normally the voltage Vdark.

On the other hands, a light shielding signal of L level is normally applied to the pulse switch SWP corresponding to the test signal input gate TFD of the test amplifier transistor TSF corresponding to the vertical signal lines LVS of the light shielding group of the columns from k+1 to m, and thereby the non-light shielding pulse is input to the test signal input gate TFD. With the non-light shielding pulse, the voltage Vdark is input to the test signal input gate TFD at the time tDark, and the voltage Vsig is input to the test signal input gate TFD at the time tSig.

The solid-state image sensor in one of the embodiments described above can perform a quantitative evaluation for a parallel processing operation for pixel signal reading from the signal lines of output of the amplifier transistors SF of pixels of the pixel unit 13 to the read signal processing unit 14 using an evaluation pattern. In a known technique for the evaluation, a test signal is directly input to a read signal processing unit including an A/D converter circuit, however, in this embodiments, a signal can be input to the signal line of the pixel via the test output amplifier, so that a impedance state from the signal line to the read signal processing unit can also be evaluated. Additionally, generating the same output state as an actual pixel is possible by inputting the test signal to the same output amplifier as the output amplifier of a pixel of the pixel unit.

Alternatively, the solid-state image sensor of any one of the above-described embodiments may be configured as described below.

A serial processing unit of a pixel group of a pixel unit 13 may be disconnected from a signal line by connecting an input to ground. A test output amplifier of a test signal output unit 12 may have the same configuration and constant number as an output amplifier of each pixel of the pixel unit 13. The test output amplifier of the test signal output unit 12 may have the same configuration as the serial processing unit of the pixel group of the pixel unit 13.

Further, a control circuit unit 16 may perform the control operation as described follows: In reading a pixel signal from the pixel unit 13, the test signal output unit 12 connects the output amplifier to the signal line by setting an input of the output amplifier of the test signal output unit 12 to the L level, resulting in output of the pixel signal from the pixel unit 13 to the signal line. In reading the test signal of the test signal output unit 12, the output of a pixel signal of the output amplifier of each pixel of the pixel unit 13 or the serial processing unit is disconnected from the signal line by setting an input signal of the output amplifier of each pixel of the pixel unit 13 or the serial processing unit to the L level. This allows the output amplifier of the test signal output unit 12 to output the test signal to the signal line.

A test signal generating unit 11 preferably has a reference voltage to generate a plurality of voltages. The control circuit unit 16 causes the test signal generating unit 11 to transit a voltage of the output amplifier of the pixel or the input of the serial processing unit from a pixel reset level to a signal level by synchronizing with a pixel signal reading time. Amplitude of the voltage generated at the test signal generating unit 11 is preferably larger than an input range of the output amplifier of the pixel or the serial processing unit.

The test signal generating unit 11 desirably changes the amplitude of the voltage output to the test output amplifier of the test signal output unit 12 for each column or each line. The pixel unit 13 may be divided into two parts, a left pixel part and a right pixel part, and the test signal generating unit 11 may be divided into a first test signal generating unit for the left pixel part and a second test signal generating unit for the right pixel part. The solid-state imaging device, accordingly, may include more than two test signal generating units and be able to control each test signal generating unit independently.

Imaging Apparatus with Disclosed Solid-State Image Sensor

Figure 15:
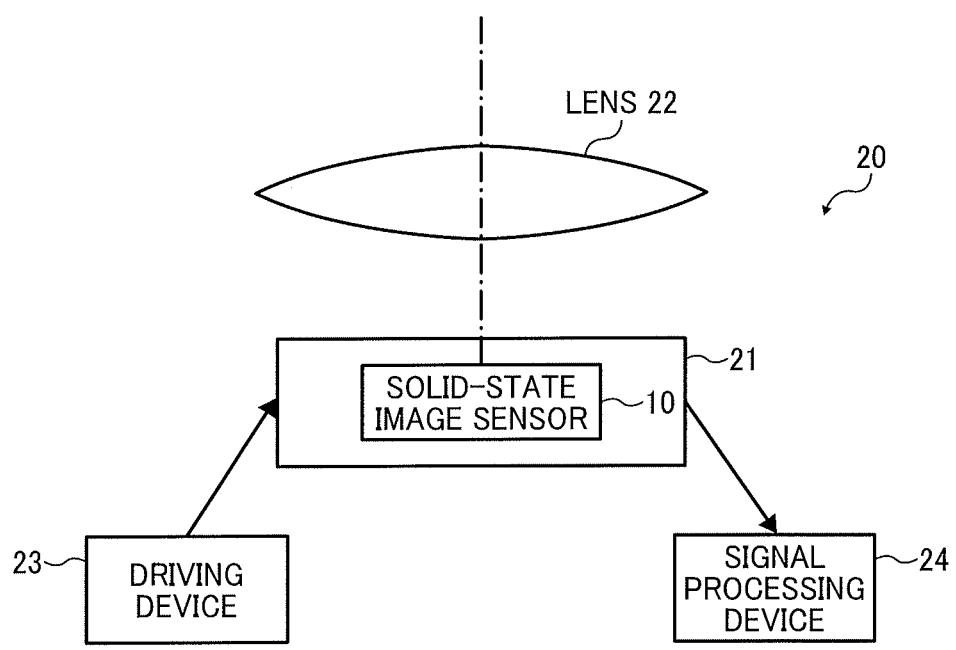
FIG. 15 is a schematic diagram illustrating an exemplary configuration of an imaging apparatus that uses the solid-state image sensor according to one of the embodiments.

FIG. 15 is a schematic diagram illustrating an exemplary configuration of an imaging apparatus that uses the solid-state image sensor of the disclosure. An imaging apparatus 20 includes an imaging device 21 with the solid-state image sensor 10. The imaging apparatus includes, for example, a camera system. The solid-state image sensor 10 may be any one of the embodiments described above. The imaging apparatus 20 includes a lens 22 configured as an optical system that form an object image on an imaging surface of the solid-state image sensor 10 of the imaging device 21 using incident light.

The imaging apparatus 20 further includes a driving device 23 to drive the imaging device 21 and a signal processing device 24 to process an output signal of the imaging device 21. The driving device 23 includes a timing generator (drive-timing signal generating circuit) to drive circuits in the imaging device 21 including the solid-state image sensor 10, and drives the imaging device 21 with a predetermined timing signal. The signal processing device 24 processes an output signal of the imaging device 21.

If being an analog output, an image signal processed with the signal processing device 24 is stored in a recording medium, such as a memory, via an analog signal processing unit (AFE). Image information recorded to the recording medium is copied as a hard copy using, for example, a printer. The image signal processed with the signal processing device 24 may be displayed as a moving image on a monitor such as a liquid crystal display. Implementing the solid-state image sensor 10 of the disclosure to the imaging device 21, as described above, can embody an imaging apparatus with a high accuracy, such as a camera system. Imaging device 21 may also be used in other imaging apparatuses than a camera system.

Although the exemplary embodiments of the disclosure have been described and illustrated above, such description is not intended that the disclosure be limited to the illustrated embodiments. It is therefore to be understood that within the scope of the appended claims, the embodiments may be practiced otherwise than as specifically described herein. Furthermore, elements and/or features of different illustrative embodiments may be combined with each other and/or substituted for each other within the scope of this disclosure and appended claims.

What is claimed is:

1. A solid-state image sensor, comprising:
a pixel unit having a plurality of pixels arranged in a matrix, each of the plurality of pixels outputs a pixel signal that is obtained by amplifying a photoelectrically converted signal using an output amplifier of each of the plurality of pixels, the pixel unit configured to output the pixel signal in units of one or more pixels;
a read signal processing circuit configured to read out the pixel signal output from the pixel unit in the units of one or more pixels, to a corresponding signal line, and process the pixel signal;
a test signal output circuit having, outside the pixel unit, a test signal output amplifier for each signal line, the test signal output circuit configured to output a test evaluation pattern signal from the test output amplifier to the signal line to be read out to the read signal processing unit, in response to a test signal input to the test output amplifier;

a test signal generating circuit configured to generate the test signal, provide, as a test signal to a light shielding test output amplifier corresponding to a light shielding group of successive signal lines, a reset level voltage of the pixel signal to a light shielding test output amplifier corresponding to a light shielding group of successive signal lines, and provide, as a test signal to a non-light shielding test output amplifier corresponding to a non-light shielding group of at least one signal line that is not included in the light shielding group, a non-light shielding pulse including the reset level voltage of the pixel signal and a signal level voltage of the pixel signal; and a control circuit to control operations of the pixel unit, the read signal processing circuit, and the test signal generating circuit, the control circuit controlling operation of the read signal processing circuit based on a same output timing, wherein in a pixel output timing, the control circuit controls the test signal output circuit to electrically disconnect the test output amplifier from the signal line and outputs a reset signal to the pixel to reset the pixel to a reset voltage and to cause the output amplifier to output the reset voltage to the signal line at a reset signal reading time, and outputs a read pixel signal to the pixel to cause the output amplifier to output the pixel signal to the signal line at a pixel signal level reading time that is a predetermined time after the reset signal reading time, and in a test output timing, the control circuit controls the pixel to electrically disconnect the output amplifier from the signal line, and the test evaluation pattern signal output from the non-light shielding test output amplifier to the signal line corresponding to the non-light shielding group, has a voltage of a reset level, in response to the signal level voltage of the non-light shielding pulse being provided to the non-light shielding test output amplifier, at the reset signal reading time and has a voltage of a pixel signal level, in response to the signal level of the non-light shielding pulse being provided to the non-light shielding test output amplifier, at the pixel signal level reading time that is the predetermined time after the reset signal reading time, the read signal processing circuit reads the reset voltage output to the signal line at the reset signal reading time in the pixel output timing, and reads the voltage of the reset level in the test evaluation pattern signal at the reset signal reading time in the test output timing, and the read signal processing circuit reads the pixel signal on the signal line at the pixel signal level reading time that is the predetermined time after the reset signal reading time in the pixel output timing, and reads the voltage of the pixel signal level in the test evaluation pattern signal at the pixel signal level reading time that is the predetermined time after the reset signal reading time in the test output timing.

2. The solid-state image sensor of claim 1, wherein the plurality of pixels of the pixel unit is classified into a plurality of pixel groups, each of the plurality of pixel groups including a serial processing unit configured to output the pixel signal from each of the plurality of pixels in time series, and wherein the pixel signal is read to the signal line in units of pixel groups.

3. The solid-state image sensor of claim 2, wherein the pixel unit further includes a memory capacitor to store the pixel signal of each of the plurality of pixels of each of the plurality of pixel groups for each of the plurality of pixels.

4. The solid-state image sensor of claim 1, wherein the read signal processing circuit operates based on an output timing of the pixel signal in reading either one of the pixel signal from the pixel unit and the test signal from the test signal output circuit.

5. The solid-state image sensor of claim 1, wherein the test signal generating circuit generates a plurality of voltages to be input to the test output amplifier of the test signal output circuit.

6. The solid-state image sensor of claim 1, wherein the test signal generating circuit includes an input voltage switch configured to switch a voltage to be input to the test output amplifier of the test signal output circuit under control of the control circuit.

7. The solid-state image sensor of claim 1, wherein the test signal generating circuit includes a pulse switch configured to:

switch a pulse to be input to the test output amplifier of the test signal output circuit under control of the control circuit.

8. An imaging apparatus comprising:

an imaging device including the solid-state image sensor of claim 1; and an optical system to focus an object image on the solid-state image sensor.

9. A solid-state image sensor, comprising:

a pixel unit including one or more pixel groups each having a plurality of pixels arranged in a matrix, each of the plurality of pixels outputs, to a serial processing unit of the pixel unit, a pixel signal that is obtained by amplifying a photoelectrically converted signal using an output amplifier of each of the plurality of pixels, the serial processing unit configured to output, in time series, corresponding pixel signals of respective pixels in a corresponding pixel group amongst the one or more pixel groups, in units of pixel groups;

a read signal processing unit configured to read out the corresponding pixel signals of the respective pixels in the corresponding pixel group output in time series from the serial processing unit of the pixel unit in the units of pixel groups, to a corresponding signal line, and process the corresponding pixel signals of the respective pixels in the corresponding pixel group;

a test signal output unit having, outside the pixel unit, a test output amplifier for each signal line, the test signal output unit configured to output a test evaluation pattern signal from the test output amplifier to the signal line to be read out to the read signal processing unit, in response to a test signal input to the test output amplifier;

a test signal generating unit configured to generate the test signal; and a control circuit to control operations of the pixel unit, the read signal processing unit, and the test signal generating unit, the control circuit controlling operations of the read signal processing unit based on a same output timing both (i) when reading the corresponding pixel signals of the respective pixels in the corresponding pixel group from the pixel unit, in the units of pixel groups, and (ii) when reading the test evaluation pattern signal from the test signal output unit, wherein the control circuit is configured to:

disconnect an output of the test output amplifier of the test signal output unit from the signal line to output the corresponding pixel signals of the respective pixels in the corresponding pixel group from the pixel unit to the signal line;

disconnect a pixel signal output of the pixel unit from the signal line to output the test signal from the test output amplifier of the test signal output unit to the signal line, wherein in reading the test signal from the test signal output unit by the control circuit, the test signal generating circuit is configured to:

provide a reset level voltage of each of the corresponding pixel signals of the respective pixels in the corresponding pixel group to a light shielding test output amplifier corresponding to a light shielding group of successive signal lines; and provide the reset level voltage of each of the corresponding pixel signals of the respective pixels in the corresponding pixel group synchronized with a reading timing of the respective pixels to a non-light shielding test output amplifier corresponding to a non-light shielding group of at least one signal line that is not including in the light shielding group in reading a reset signal level of the corresponding pixel signals of the respective pixels in the corresponding pixel group, and provide a signal level voltage of each of the corresponding pixel signals of the respective pixels in the corresponding pixel group in reading a pixel signal level of the corresponding pixel signals of the respective pixels in the corresponding pixel group.

10. The solid-state image sensor of claim 9, wherein the test signal generating circuit includes an input voltage switch configured to switch a voltage to be input to the test output amplifier of the test signal output unit under control of the control circuit.

11. The solid-state image sensor of claim 9, wherein the test signal generating circuit includes a pulse switch configured to:

switch a pulse to be input to the test output amplifier of the test signal output unit under control of the control circuit.

12. The solid-state image sensor of claim 1, wherein the test output amplifier is directly connected to the corresponding signal line which is connected to the read signal processing circuit to which the pixel signal is output.

* * * * *